(12) United States Patent
Nukada et al.

(10) Patent No.: US 11,179,914 B2
(45) Date of Patent: Nov. 23, 2021

(54) POLYIMIDE LAMINATED FILM AND METHOD OF PREPARING POLYIMIDE LAMINATED FILM

(71) Applicant: FUJIFILM Business Innovation Corp., Tokyo (JP)

(72) Inventors: Katsumi Nukada, Kanagawa (JP);
Tomoya Sasaki, Kanagawa (JP);
Takashi Imai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 101 days.

(21) Appl. No.: 15/903,428

(22) Filed: Feb. 23, 2018

(65) Prior Publication Data

US 2019/0001644 A1    Jan. 3, 2019

(30) Foreign Application Priority Data

Jun. 29, 2017 (JP) .............. JP2017-126928

(51) Int. Cl.
| | |
|---|---|
| *B32B 9/02* | (2006.01) |
| *B32B 27/28* | (2006.01) |
| *C08L 79/08* | (2006.01) |
| *B32B 5/14* | (2006.01) |
| *C08G 73/10* | (2006.01) |
| *C09D 179/08* | (2006.01) |
| *B32B 17/10* | (2006.01) |

(52) U.S. Cl.
CPC .............. *B32B 9/025* (2013.01); *B32B 5/145* (2013.01); *B32B 17/10* (2013.01); *B32B 27/281* (2013.01); *C08G 73/105* (2013.01); *C08G 73/1039* (2013.01); *C08G 73/1042* (2013.01); *C08G 73/1067* (2013.01); *C08G 73/1071* (2013.01); *C08L 79/08* (2013.01); *C09D 179/08* (2013.01); *B32B 2379/08* (2013.01); *C08L 2203/16* (2013.01)

(58) Field of Classification Search
None
See application file for complete search history.

(56) References Cited

U.S. PATENT DOCUMENTS

| | | | |
|---|---|---|---|
| 5,286,280 A | 2/1994 | Chiou | |
| 2003/0129379 A1* | 7/2003 | Yao | .......... B29C 41/12 428/308.4 |
| 2010/0116131 A1 | 5/2010 | Yoshinaga et al. | |

(Continued)

FOREIGN PATENT DOCUMENTS

| | | |
|---|---|---|
| JP | 6-269650 A | 9/1994 |
| JP | 10-302749 A | 11/1998 |

(Continued)

OTHER PUBLICATIONS

"High-functionalization and Application Technique for Polyimide", Science & Technology Co., Ltd., 2008, 3 pgs., subsection 3.6, Japan.

(Continued)

*Primary Examiner* — Chinessa T. Golden
(74) *Attorney, Agent, or Firm* — Sughrue Mion, PLLC

(57) ABSTRACT

A polyimide laminated film includes a porous polyimide layer that has a porosity of from 30% to 90% and pores having a spherical shape and a non-porous polyimide layer that has a porosity of 5% or less.

16 Claims, 1 Drawing Sheet

(56) References Cited

U.S. PATENT DOCUMENTS

| | | | | |
|---|---|---|---|---|
| 2013/0020117 | A1* | 1/2013 | Yamato | C08J 7/047 |
| | | | | 174/258 |
| 2014/0127494 | A1* | 5/2014 | Yakuwa | C08J 5/18 |
| | | | | 428/315.7 |
| 2016/0024256 | A1* | 1/2016 | Miyamoto | C08G 73/1071 |
| | | | | 525/436 |
| 2016/0111695 | A1 | 4/2016 | Kanamura et al. | |
| 2016/0185932 | A1* | 6/2016 | Sugawara | C08J 9/26 |
| | | | | 429/246 |
| 2016/0279883 | A1 | 9/2016 | Nukada et al. | |

FOREIGN PATENT DOCUMENTS

| | | |
|---|---|---|
| JP | 2006-224098 A | 8/2006 |
| JP | 2007-197650 A | 8/2007 |
| JP | 2009073124 A | 4/2009 |
| JP | 2010-24385 A | 2/2010 |
| JP | 5331627 B2 | 10/2013 |
| JP | 2016-169373 A | 9/2016 |
| JP | 2016-183333 A | 10/2016 |
| JP | 2017148986 A | 8/2017 |
| WO | WO 2014/196656 A1 | 12/2014 |

OTHER PUBLICATIONS

Communication dated Apr. 6, 2021, from the Japanese Patent Office in Application No. 2017-126928.

Office Action dated Sep. 21, 2021 in Japanese Application No. 2017-126928 English.

* cited by examiner

POLYIMIDE LAMINATED FILM AND METHOD OF PREPARING POLYIMIDE LAMINATED FILM

CROSS-REFERENCE TO RELATED APPLICATIONS

This application is based on and claims priority under 35 USC 119 from Japanese Patent Application No. 2017-126928 filed Jun. 29, 2017.

BACKGROUND

1. Technical Field

The present invention relates to a polyimide laminated film and a method of preparing a polyimide laminated film.

2. Related Art

A polyimide resin is a material having excellent properties such as mechanical strength, chemical stability, and heat resistance, and a porous polyimide film having these properties has attracted attention.

SUMMARY

According to an aspect of the invention, there is provided a polyimide laminated film including:

a porous polyimide layer that has a porosity of from 30% to 90% and pores having a spherical shape; and a non-porous polyimide layer that has a porosity of 5% or less.

BRIEF DESCRIPTION OF THE DRAWINGS

Exemplary embodiments of the present invention will be described in detail based on the following figures, wherein.

DETAILED DESCRIPTION

Figure 1:
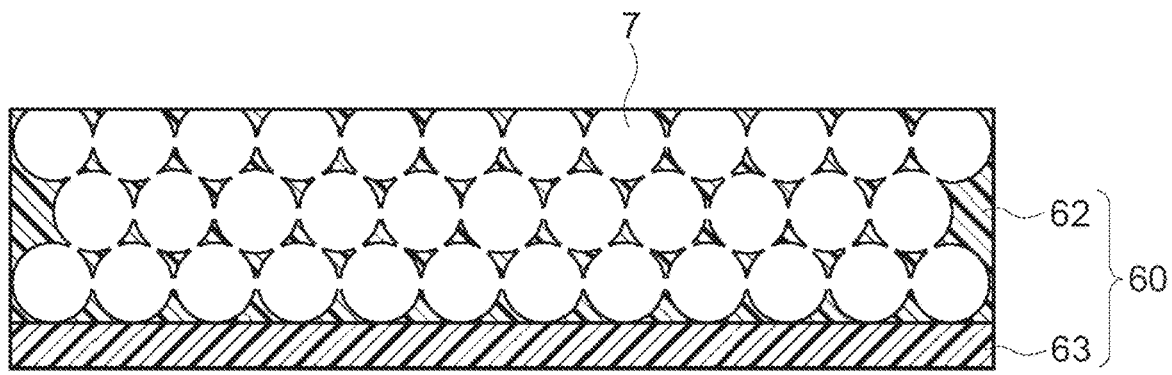
FIG. 1 is schematic sectional view illustrating an example of a polyimide laminated film according to the exemplary embodiment.

Hereinafter, the exemplary embodiment which is one example of the present invention will be described in detail.
Polyimide Laminated Film A polyimide laminated film according to the exemplary embodiment includes a porous polyimide layer (hereinafter, simply referred to as a "porous layer") which has a porosity of from 30% to 90% and pores having a spherical shape, and a non-porous polyimide layer (hereinafter, also simply referred to as a "filling layer") which has a porosity of 5% or more.

Note that, the polyimide laminated film of the exemplary embodiment may be configured to include one layer porous layer (a porous polyimide layer) and one layer filling layer (a non-porous polyimide layer), may be configured to include two or more porous layers, or may be configured to include two or more filling layers.

In the related art, for example, a porous polyimide film has been used for a gas separation film, a low dielectric constant material, and a heat insulating material. However, the strength of the porous polyimide film having a single-layer structure is low, and even if two or more porous polyimide films are laminated to form a laminated film, if the porosity of each of the layers laminated is high, the mechanical strength is also low. Further, in a case where the uniformity of the voids is low or the uniformity of the interface is low, variation with respect to the local dielectric properties is caused, and thus the desired performance may not be exhibited in some cases.

In contrast, the polyimide laminated film of the exemplary embodiment is obtained by laminating a porous polyimide layer (a porous layer) and a non-porous polyimide layer (a filling layer) having a porosity of 5% or less, and since the filling layer has a function of improving strength, it is possible to provide high mechanical strength even with respect to the whole laminated film.

In addition, in the exemplary embodiment, flaking at an interface between the porous layer and the filling layer is likely to be prevented in a case where the porous layer directly contacts the filling layer, and in a case where the porous layer and the filling layer are laminated via another layer, the porous layer is likely to be prevented from flaking from another layer. With this, the mechanical strength may be improved.

Further, in the exemplary embodiment, the pore in the porous layer is formed into a spherical shape, and thus a stress is likely to be relaxed when the stress is applied, and from this viewpoint, the mechanical strength may be improved as well.

From the above viewpoint, it is inferred that in the polyimide laminated film according to the exemplary embodiment has achieved the high mechanical strength.

Also, in a case where the polyimide laminated film is used as a gas separation film or the like, in the exemplary embodiment, the polyimide laminated film includes the non-porous polyimide layer (the filling layer) which is a thin film having a high uniformity, and the porous polyimide layer (the porous layer) having a high porosity, which are laminated, and thus gas may reach the non-porous polyimide layer (the filling layer) with high uniformity through the voids, and thereby gas separation may be efficiently performed.

Next, preferable configurations of the polyimide laminated film according to the exemplary embodiment will be described in detail.
Layer Configuration The polyimide laminated film of the exemplary embodiment may be configured to include one layer porous layer (a porous polyimide layer) and one layer filling layer (a non-porous polyimide layer). As illustrated in FIG. 1, examples of the polyimide laminated film include a polyimide laminated film 60 which includes a one-layer porous layer 62 including a pore 7 which has a spherical shape and having a porosity of from 30% to 90%, and a one-layer filling layer 63 having a porosity of 5% or less (FIG. 1 illustrates a configuration having no pores). Further, the configuration of the polyimide laminated film is not limited, and for example, a configuration of two or more porous layers, or a configuration of two or more filling layers may be employed. Accordingly, for example, a configuration of a laminated film obtained by laminating one porous layer and two filling layers such that both sides of the one porous layer are nipped between the two filling layers may be employed, or a configuration of a laminated film obtained by laminating two porous layers and one filling layer such that both sides of the one filling layer are nipped between the two porous layers may be employed.

Here, as compared with the filling layer, the porous layer is greatly affected by moisture (for example, moisture in the atmosphere in the case of the polyimide laminated film exposed to the atmosphere) from the outside, and thus a surface on the side contacting the outside is preferably formed of the filling layer. From this viewpoint, a laminated film obtained by laminating one porous layer and two filling layers such that both sides of the one porous layer are nipped between the two filling layers is preferable.

Film Thickness

In a case where the polyimide laminated film is used for a printed circuit board or the like, the dielectric properties of the film influence the performance, and thus it is required to adjust the dielectric constant of the film as a whole to be within the required range. The polyimide laminated film according to the exemplary embodiment includes a porous polyimide layer (a porous layer) and a non-porous polyimide layer (a filling layer), and generally, the porous layer has the dielectricity lower than that of the filling layer. Thus, by adjusting the thickness of each of the porous layer and the filling layer, it is easy to adjust the dielectric constant of the film as a whole to be within a required range.

In addition, generally, the filling layer contributes more to improving the strength, and accordingly, by adjusting the thickness of each of the porous layer and the filling layer, it is easy to adjust the mechanical strength to be within a required range.

Ratio of Film Thickness

In the exemplary embodiment, in a case where an average film thickness of the porous layer (in a case of a laminated film having plural porous layers, a sum of the respective average film thicknesses of the plural porous layers) is set as $Tp$, and an average film thickness of the filling layer (in a case of a laminated film having plural filling layers, a sum of the respective average film thicknesses of the plural filling layers) is set as $Tn$, it is preferable to satisfy the following Expression (1).

$$Tp > Tn \qquad \text{Expression (1)}$$

By satisfying Expression (1), that is, by setting the layer thickness of the porous layer to be thicker than the layer thickness of the filling layer, a film with a lower dielectric constant may be obtained.

Note that, from the viewpoint of obtaining the lower dielectric constant film, a ratio (Tp/Tn) of Tp and Tn is further preferably from more than 1/1 and is 100/1 or less, and is still further preferably from more than 1/1 and is 50/1 or less.

Total Film Thickness

In addition, it is preferable that the total film thickness (Tp+Tn) of the porous layer and the filling layer included in the polyimide laminated film satisfies the following Expression (2).

$$10\,\mu m \leq Tp+Tn \leq 100\,\mu m \qquad \text{Expression (2)}$$

When the total film thickness (Tp+Tn) is 10 μm or more, the mechanical strength is likely to be further improved. In addition, when the total film thickness (Tp+Tn) is 100 μm or less, the versatility as the polyimide laminated film is likely to be further improved.

Note that, the value of (Tp+Tn) is preferably from 15 μm to 90 μm, and is further preferably from 20 μm to 80 μm.

Film Thickness of Each Layer

The average film thickness Tp of the porous layer (here, a sum of the respective average film thicknesses of plural porous layers in a case of a laminated film having the plural porous layers) is preferably from 5 μm to 100 μm, is further preferably from 5 μm to 70 μm, and is still further preferably from 7 μm to 65 μm.

When Tp is 5 μm or more, it is possible to obtain the lower dielectric constant film. In addition, when Tp is 100 μm or less, the polyimide laminated film as a whole becomes thinner, and thus the versatility as a film is likely to be further improved.

The average film thickness Tn of the filling layer (here, a sum of the respective average film thickness of plural filling layers in a case of a laminated film having the plural filling layers) is preferably from 0.5 μm to 100 μm, is further preferably from 1 μm to 70 μm, and is still further preferably from 1 μm to 50 μm.

When Tn is 0.5 μm or more, and is preferably 1 μm or more, the mechanical strength is likely to be further improved, and the gas separability is also further improved. In addition, when Tn is 100 μm or less, it is possible to obtain the lower dielectric constant film, and the thickness of the polyimide laminated film as a whole becomes thinner, and thereby the versatility as a film, is likely to be further improved.

Film Thickness of Whole Film

The average film thickness of the polyimide laminated film is not particularly limited, but is from 10 μm to 500 μm, and is preferably from 10 μm to 300 μm.

Method of Measuring Average Film Thickness

In this regard, the average film thickness Tp of the porous layer, the average film thickness Tn of the filling layer, and the average film thickness of the polyimide laminated film are measured by the following measuring method. The film thickness of each film may be measured from, a cross-section image obtained by cutting the cross-section, and capturing the cut cross-section (for example, capturing is performed with a transmission electron microscope, a scanning electron microscope, and a laser microscope).

Interface Between Porous Layer and Filling Layer

It is preferable that the porous layer (porous polyimide layer) directly contacts the filling layer (non-porous polyimide layer). When the porous layer directly contacts the filling layer, it is likely that the flaking at the interface between the porous layer and the filling layer is prevented, the mechanical strength is further improved, and an adhesive layer is not provided. With this, the dielectric properties may be stabilized and steps of preparing may be simplified.

Maximum Cross-Section Height Zt

Note that, from the viewpoint of preventing unevenness in the performance of the polyimide laminated film depending on the position, in the cross-section in the direction orthogonal to the interface between the non-porous polyimide layer and the porous polyimide layer, maximum cross-section height Zt obtained from a sum of the maximum value of a mountain height Zp of a contour curve of the interface and the maximum value of a valley depth Zv is preferably 0.5 μm or less, is further preferably 0.4 μm or less, and is still further preferably 0.3 μm or less.

Note that, the maximum cross-section height Zt of the contour curve of the interface is specified based on JIS-B0601 (2013). Specifically, the cross-section image (reference length of 10 μm) in the direction orthogonal to the interface at which the non-porous polyimide layer directly contacts the porous polyimide layer is captured with a SEM or the like, and an average line is set with respect to the interface in the cross-section image based on JIS-B0601. In the cross-section image, a mountain height (maximum Zp) of the mountain with the highest height from the average line to the peak, and a valley depth (maximum Zv) at the valley where the depth from the average line to the valley bottom is the deepest are obtained, and from the sum, the maximum cross-section height Zt is obtained.

Here, in a case where it is difficult to draw an average line for specifying the maximum value of the mountain height Zp and the maximum value of the valley depth Zv in the contour curve of the interface in the cross-section image, a reference line which is parallel to the average line is separately provided at a position of 1 μm on the non-porous polyimide layer side from the average line of the interface. Then, a distance (the maximum distance, max) to the mountain which is farthest from the reference line and a distance (the minimum distance, min) to a valley which is closest from the reference line are obtained, and from a difference between the maximum distance max and the minimum distance min, the maximum cross-section height Zt may be obtained. Note that, the reference line is drawn to the outside of the non-porous polyimide layer in a case where the film thickness of the non-porous polyimide layer is 1 μm or less.

Pore in Porous Layer

In the exemplary embodiment, the pore in the porous layer (the porous polyimide layer) is formed into a spherical shape. In the exemplary embodiment, the meaning that the shape of the pore is "spherical shape" includes both of a spherical shape and an almost spherical shape (substantially spherical shape). Specifically, it means that the ratio of the pore in which a ratio (long diameter/short diameter) of a long diameter to a short diameter is from 1 to 1.5 is 90% or more. When the ratio of the pore is large, the ratio of the pore having a spherical shape is increased. The pore in which the ratio (long diameter/short diameter) of the long diameter to the short diameter is from 1 to 1.5 is preferably from 93% to 100%, and is further preferably from 95% to 100%. In addition, as the ratio of the long diameter and the short diameter is close to 1, the shape becomes almost spherical.

Regarding the pore, it is preferable to have a shape in which the pores are connected to each other and are continuous (refer to FIG. 1). A pore diameter of a portion where the pores are connected to each other may be, for example, from 1/100 to 1/2 of the maximum diameter of the pore diameter, is preferably from 1/50 to 1/3, and is further preferably from 1/20 to 1/4. Specifically, an average value of the pore diameter of the portion where the pores are connected to each other may be from 5 nm to 1,500 nm.

The average value of the pore diameter is not particularly limited, but may be from 0.01 μm to 2.5 μm, is preferably from 0.05 μm to 2.0 μm, is further preferably from 0.1 μm to 1.5 μm, and is still further preferably from 0.15 μm to 1.0 μm.

In the exemplary embodiment, the ratio of the maximum, diameter to the minimum diameter of the pore which is included in the porous layer (the ratio of the maximum value of the pore diameter to the minimum, value) is preferably from 1 to 2, is further preferably from 1 to 1.9, and is still further preferably from 1 to 1.8. Among them, the ratio of the maximum value of the pore diameter to the minimum value is preferably close to 1. When, the ratio of the maximum value of the pore diameter to the minimum value is within this range, the variation of the pore diameter is prevented. In addition, in a case where the polyimide laminated film according to the exemplary embodiment is applied to, for example, a gas separation film, the porous layer may reach the filling layer having a gas separation function without interfering with the passage of the gas, and thus the gas separation function may be efficiently performed.

Note that, "the ratio of the maximum diameter to the minimum diameter of the pore" is a ratio expressed by a value (that is, the maximum value/minimum value of the pore diameter) obtained by dividing the maximum diameter of the pore by the minimum diameter.

The maximum value, the minimum value, and the average value of the pore diameter, the average value of the pore diameters of the portions where the pores are connected to each other, and the long diameter and the short diameter of the pore are values observed and measured by scanning electron microscope (SEM). Specifically, first, the porous layer is cut off from the polyimide laminated film so as to prepare a sample for measurement. In addition, the sample for measurement is observed and measured by VE SEM manufactured by KEYENCE with image processing software equipped as standard. For observation and measurement, 100 samples are taken for each of the pore portions in the cross-section of the sample for measurement, and the average value and the minimum diameter, the maximum diameter, and the arithmetic mean diameter of each are obtained. In a case where the shape of the pore is not circular, the longest part is set as a diameter. Also, for each of the above pore portions, the long diameter and the short diameter are observed and measured with VE SEM manufactured by KEYENCE with the image processing software equipped as standard, and thereby the ratio of the long diameter/short diameter is obtained.

Porosity

In the exemplary embodiment, the porosity of the porous layer (the porous polyimide layer) is 30% or more, is preferably 40% or more, and is further preferably 50% or more. Note that, an upper limit of the porosity of the porous layer is preferably 90% or less.

When the porosity of the porous layer is 30% or more, it is possible to obtain a film, having lower dielectric constant. In addition, when the porosity of the porous layer is 90% or less, it is likely to improve the mechanical strength.

Note that, the porosity of the filling layer (the non-porous polyimide layer) is 5% or less, is preferably 3% or less, and is further preferably 1% or less. The porosity of the filling layer is preferably close to 0%.

Here, the porosity of each of the porous layer and the filling layer is measured by the following measuring method.

The sample for the measurement is cut off in the film thickness direction from of the polyimide laminated film, and an area (S) and a weight (G) of this sample for the measurement are measured. When the porosity of the porous layer is set as Vp (%), the film thickness is set as tp, and the specific gravity of polyimide is set as dp; On the other hand, the porosity of the filling layer is set as Vn (%), the film thickness is set as tn, and the specific gravity of polyimide is set as dn, a relationship expressed by $G=\{(100-Vp)/100\} \times S \times tp \times dp + \{(100-Vn)/100\} \times S \times tn \times dn$ is satisfied. In this case, in a case where the porosity Vn of the filling layer is 0%, a relationship expressed by $G=\{(100-Vp)/100\} \times S \times tp \times dp + S \times tn \times dn$ is satisfied, and with this, it is possible to calculate Vp by using G, S, tp, dp, tn, and dn.

In addition, in a case of including plural porous layers having different porosity Vp, or in a case of including the filling layer in which the porosity Vn is not 0%, an area ratio of a pore portion to a polyimide portion is calculated and obtained from an image of the cross-section measured by using a scanning electron microscope (SEM) or the like.

Components

Components Included in Porous Layer

The porous layer (the porous polyimide layer) includes a polyimide resin. As the polyimide resin, any existing material may be used, and examples thereof include a polyimide resin in which some or all of polyimide precursor described later is imidized. Note that, in a case where the polyimide laminated film according to the exemplary embodiment is used as a low dielectric constant base material, it is effective to use a fluorine atom-containing polyimide as the polyimide resin included in the porous layer.

In addition, the porous layer preferably contains an organic amine compound. From the viewpoints of preventing cracking and controlling the shape of pores, the organic amine compound is preferably 0.001% by weight or more with respect to the entire porous layer. When the content of the organic amine compound is within the above range, the porous polyimide film is likely to be prevented from being cracked. From the same viewpoint, the lower limit content of the organic amine compound is preferably 0.003% by weight or more, and is further preferably 0.005% by weight or more. Further, the upper limit content of the organic amine compound is 1.0% by weight or less, and is further preferably 0.9% by weight or less.

Specific examples of the organic amine compound will be described.

In addition, the porous layer preferably contains a resin other than the polyimide resin. As the resin other than the polyimide resin, a resin in which "resin particles" contained a porous layer forming polyimide precursor solution described below are melted or dissolved, and then is infiltrated into the porous layer so as to remain is preferable.

From the viewpoints of preventing cracking and controlling the shape of pores, the content of the resin other than the polyimide resin is preferably from 0.005% by weight to 1.0% by weight with respect to the entire porous layer. From the same viewpoint, the lower limit content of the resin other than the polyimide resin is further preferably 0.008% by weight or more, and is still further preferably 0.01% by weight or more. In addition, the upper limit content of the resin other than the polyimide resin is preferably 1.0% by weight, and is further preferably 0.9% by weight.

In addition, an organic amine compound may be contained in the filling layer.

Verification of Contents of Organic Amine Compound, Resin Other than Polyimide Resin, and Polar Aprotic Solvent The presence and content of each of the organic amine compound, the polar aprotic solvent, and the resin other than polyimide in the porous layer may be measured, for example, by analyzing and determining components detected by pyrolysis gas chromatography-mass spectrometry (GC-MS). Specifically, the measurement is performed as follows.

The porous layer in the polyimide laminated film is cut by a knife or the like, and the component included therein are analyzed using a gas chromatography-mass spectrometer (GCMS QP-2010, manufactured by Shimadzu Corporation) equipped with a free-fall pyrolyzer (PY-2020D, manufactured by Frontier Laboratories Ltd.). The organic amine compound and the polar aprotic solvent are determined at a pyrolysis temperature of 400° C. after precisely weighing 0.40 mg of the porous layer.

The resin component other than a polyimide resin is determined at a pyrolysis temperature of 600° C. after precisely weighing 0.20 mg of the porous polyimide film. Regarding the resin other than a polyimide resin, a chromatogram at a pyrolysis temperature of 400° C. and a chromatogram at a pyrolysis temperature of 600° C. are compared to each other, and a larger amount of a styrene monomer obtained by depolymerization of polystyrene is detected at a pyrolysis temperature of 600° C. than at a pyrolysis temperature of 400° C. As a result, it is verified that the result is derived from a polymer.

Pyrolyzer: PY-2020D, prepared by Frontier Laboratories Ltd.

Gas chromatography-mass spectrometer: GCMS QP-2010, manufactured by Shimadzu Corporation Pyrolysis temperature: 400° C., 600° C.

Gas chromatography introduction temperature: 280° C.

Injection method: split ratio=1:50

Column: manufactured by Frontier Laboratories Ltd., Ultra ALLOY-5, 0.25 μm, 0.25 μm ID, 30 m Gas chromatography temperature program: 40° C.→20° C./min→keeping at 280° C. for 10 min Mass range: EI, m/z=29-600 (the content of the resin other than a polyimide resin)

Components Included in Filling Layer

The filling layer (the non-porous polyimide layer) includes a polyimide resin. As the polyimide resin, any existing material may be used, and examples thereof include a polyimide resin in which some or all of polyimide precursor described later is imidized.

In a case where the filling layer has a gas separation function, 6FDA polyimide [(6FDA polyimide obtained by a condensation reaction of 5,5'-2,2,2-trifluoro-1-(trifluoromethyl) ethylidene-bis-1,3-isobenzofurandione (6FDA) and aromatic diamine (for example, 1,3-diaminobenzene))], and polyimide described in "high-performance of polyimide and application technology (published by Science & Technology, P. 283-291 (2008))" are used. In addition, a polyimide resin exhibiting known gas separation performance may be also preferably used.

In addition, in a case where strength is imparted to the filling layer, a polyimide resin obtained from at least one kind of pyromellitic dianhydride, and 3,3',4,4'-biphenyl tetracarboxylic dianhydride, and at least one kind of p-phenylenediamine, m-phenylenediamine, and 4,4'-diaminodiphenyl ether is preferably used.

Further, in a case where the filling layer directly contacts the porous layer and adhesiveness is imparted to interfaces of both of the filling layer and the porous layer, the same polyimide resin (that is, the polyimide resin synthesized from the same monomer) is preferably used in the filling layer and the porous layer.

Method of Preparing Polyimide Laminated Film

Next, a method of preparing the polyimide laminated film according to the exemplary embodiment will be described in detail.

The polyimide laminated film according to the exemplary embodiment is prepared through a preparing method having the following steps.

Step of Preparing First Polyimide Precursor Solution

A step of preparing a first polyimide precursor solution (also referred to as a "filling layer forming polyimide precursor solution") containing a solvent and a first polyimide precursor, and not containing first resin particles which are not dissolved in the first polyimide precursor solution or containing the first resin particles such that a volume ratio of the first resin particles is 5% or less after film formation Step of Preparing Second Polyimide Precursor Solution A step of preparing a second polyimide precursor solution (also referred to as a "porous layer forming polyimide precursor solution") containing an aqueous solvent, a second polyimide precursor, and an organic amine compound, and further containing second resin particles which are not dissolved in the second polyimide precursor solution such that a volume ratio of the second resin particles is 30% or more after film formation First Film Forming Step A first film forming step of forming a first film (a filling film) on a substrate with the first polyimide precursor solution Second Film Forming Step A second film forming step of forming a second film (a porous film) on the first film with the second polyimide precursor solution Imidizing Step An imidizing step of imidizing the first film and the second film by concurrently or separately heating the first film and the second film Resin Particle Removing Step A resin particle removing step of removing first and second resin particles from the first and second films Here, the meaning of "not dissolved" includes a case where a target substance is not dissolved in a target liquid within a range from 3% by weight or lower at 25° C.

Hereinafter, each step will be described.

Step of Preparing Second Polyimide Precursor Solution

Before the step of preparing the first polyimide precursor solution (a filling layer forming polyimide precursor solution), first, step of preparing the second polyimide precursor solution (a porous layer forming polyimide precursor solution) will be described. Note that, when the ratio of the resin particles in the second polyimide precursor solution is adjusted such that the porosity is 5% or less, the second polyimide precursor solution may be used as the first polyimide precursor solution.

The materials used for the second polyimide precursor solution (the porous layer forming polyimide precursor solution) are not particularly limited as long as the materials contain a solvent and a polyimide precursor. For example, the solvent is preferably an aqueous solvent, and may contain an organic amine compound. In addition, the solvent may contain the resin particles for forming a porous structure, and as the resin particles, a resin particle having an acidic group on the surface is preferably used.

When resin particle having an acidic group on the surface is preferably used is used as the resin particles, the dispersibility of the resin particles is improved as compared with a resin particle having no acidic group on the surface. The reason for this is presumed as follows.

The polyimide film is obtained in such a manner that coating is performed with, for example, a polyimide precursor solution (for example, N-methyl pyrrolidone (hereinafter, may be referred to as "NMP") which is dissolved in the organic solvent, or a polyimide precursor solution which is in a state of being dissolved in a highly polar organic solvent such as N,N-dimethyl acetamide (hereinafter, may be referred to as "DMAc"), and then the coated material is heated.

Depending on the intended use, the polyimide film may contain particles such as inorganic particles and resin particles, and in this case, a polyimide precursor solution in which the particles are mixed is used. For example, in a case where the inorganic particles are mixed into the polyimide precursor solution which is dissolved in the highly polar organic solvent so as to prepare a particle dispersion polyimide precursor solution, the dispersibility of the inorganic particles is deteriorated in the polyimide precursor solution.

On the other hand, in a case where the resin particles are mixed into the polyimide precursor solution which is dissolved in the highly polar organic solvent, typical resin particles (for example, polystyrene resin particles) may be dissolved by the highly polar organic solvent, and the dispersibility of the resin particles is deteriorated in the polyimide precursor solution. In addition, for example, in a case where the resin particles which are less likely to be dissolved in the highly polar organic solvent are prepared through emulsion polymerization or the like, in order to mix the resin particles with the polyimide precursor solution dissolved in the highly polar organic solvent, the resin particles may be substituted with the highly polar organic solvent. In this case, when the organic solvent of the resin particles is substituted with the highly polar organic solvent, the resin particles may be extracted from the dispersion of the resin particles, and the extracted resin particles may be aggregated, which may cause deterioration of the dispersibility. In addition, in a case where the resin particles having no acidic group on the surface are dispersed in the polyimide precursor solution of the aqueous solvent, in order to dissolve the polyimide precursor in the aqueous solvent, it is required to form a large amount of basic substance and salt such as an organic amine, and thus the dispersibility may be deteriorated depending on the particle diameter and the concentration of the resin particles.

In contrast, when the resin particles having an acidic group on the surface are used for the second polyimide precursor solution in the exemplary embodiment, the dispersibility of the resin particles is improved. The reason for this is considered that the acidic group present on the surface of the resin particle forms a base and salt such as an organic amine compound used for dissolving the polyimide precursor in the aqueous solvent, and thus the dispersibility with respect to the aqueous solvent is improved. In addition, it is also considered that there is no need to extract and dry the resin particles having an acidic group on the surface, and thus a polyimide precursor is formed in a state where the resin particles are prevented from being aggregated at the time of the drying. Further, it is considered that an unreacted amine terminal which is present in the polyimide precursor in the aqueous solvent forms a pair with the acidic group on the surface of the resin particle, and functions as a dispersant of the resin particles, and thereby the dispersibility of the resin particles is improved.

From the above description, it is presumed that when the resin particles having an acidic group on the surface in the exemplary embodiment are used, the dispersibility of the resin particles is improved as compared with the case where the second polyimide precursor solution is prepared from the resin particles having no acidic group on the surface and the polyimide precursor solution.

In addition, in the step of preparing the second polyimide precursor solution in the exemplary embodiment, it is preferable that a polyimide precursor is formed in the resin particle dispersion in which the resin particles are dispersed in advance. With this, as for the second polyimide precursor solution, preparing from the resin particle dispersion to the second polyimide precursor solution is performed in one system (for example, one container), the step of preparing the second polyimide precursor solution is simplified.

Note that, in the second polyimide precursor solution obtained by the above-de scribed method, the dispersibility of the resin particles is improved. For this reason, in the resin particle-containing polyimide film obtained from the polyimide precursor solution, it is easy to prevent variations in the distribution of the resin particles.

In addition, a coated film is formed by using the second polyimide precursor solution containing the resin particles having an acidic group on the surface, the coated film is dried so as to form a film, the film is heated and is subjected to imidization, and the resin particles are removed, thereby forming the porous polyimide layer (the porous layer) in the exemplary embodiment. In the porous polyimide layer formed by this method, it is easy to prevent the variation of the pore distribution. In addition, it is easy to prevent variations of the shape of the pore, the pore diameter, and thus like. The reason for this is presumed as follows.

The dispersibility of the second polyimide precursor solution including the resin particles having an acidic group on the surface is improved in the exemplary embodiment, and thus in the porous polyimide layer after removal of the resin particles, the variation of the pore distribution is considered to be easily prevented.

Further, when the resin particles having an acidic group on the surface are used, the variations of the shape of the pore, the pore diameter, and the like are considered to be easily prevented. The reason for this is considered that the resin particles having an acidic group on the surface effectively contribute to relaxation of residual stress in the imidizing step of the polyimide precursor.

In addition, the polyimide precursor is dissolved in the aqueous solvent, and thus the boiling point, of the polyimide precursor solution is about 100° C. For this reason, the solvent is rapidly volatilized while heating the film including the polyimide precursor and the resin, particles, and then an imidization reaction progresses. Before the resin particles in the film are deformed by heat, the fluidity of the film is lost, and the film is not dissolved in an organic solvent. Therefore, it is thought that the shape of pores is likely to be maintained.

In addition, in the porous polyimide layer formed, by forming the resin particle-containing polyimide film by using the second polyimide precursor solution containing the resin particles having an acidic group on the surface, and removing the resin particles, it is easy to prevent cracking from occurring. This is presumed that the resin particles having an acidic group on the surface effectively contribute to relaxation of residual stress in the imidizing step of the polyimide precursor.

Note that, examples of the method of forming the porous polyimide layer include a method of forming a porous polyimide layer by forming a film with a polyimide precursor solution in which silica particles are dispersed, baking this film, and then removing the silica particles. However, according to this method, it is necessary to use chemicals such as hydrofluoric acid in the process of removing the silica particles. Therefore, these preparing methods have low productivity and high cost.

In addition, it is considered that in a case of using the silica particles are used, it is difficult to absorb volume shrinkage in the imidizing step, and thus the cracking is likely to occur in the porous polyimide layer after imidization. Further, it is considered that in the case of using the silica particles, the chemicals such as hydrofluoric acid are used, and thus ions are likely to remain as impurities.

In contrast, the porous polyimide layer obtained by using the resin particles instead of the silica particles does not use hydrofluoric acid to remove the resin particles, and thus the ions are prevented from remaining as impurities.

As the method of preparing of the second polyimide precursor solution, the following method is exemplified.

First, the resin particle dispersion in which the resin particles (preferably, the resin particles having an acidic group on the surface) are dispersed in the aqueous solvent is prepared. After that, in the resin particle dispersion, tetracarboxylic dianhydride and a diamine compound are polymerized in the presence of the organic amine compound, and thereby a polyimide precursor is formed.

Specifically, the method includes a step of preparing the resin particle dispersion in which the resin particles are dispersed in the aqueous solvent (hereinafter, may be referred to as a "resin particle dispersion preparing step"), and a step of mixing an organic amine compound, a tetracarboxylic dianhydride, and a diamine compound to a resin particle dispersion, and polymerizing the tetracarboxylic dianhydride and the diamine compound to form a polyimide precursor (hereinafter, may be referred to as a "polyimide precursor forming step").

Resin Particle Dispersion Preparing Step

The method used in the resin particle dispersion preparing step is not particularly limited as long as it is possible to obtain the resin particle dispersion in which the resin particles (preferably, the resin particles having an acidic group on the surface) are dispersed in the aqueous solvent.

For example, a method of weighing the resin particles, which are not dissolved in the polyimide precursor solution, and an aqueous solvent for the resin particle dispersion, and mixing and stirring the resin particles and the aqueous solvent so as to obtain the resin particle dispersion is exemplified. The method of mixing and stirring the resin particles and the aqueous solvent is not particularly limited. For example, a method of mixing the resin particles while stirring the aqueous solvent may be exemplified. Also, at least one of an ionic surfactant and a nonionic surfactant may be mixed in terms of improving the dispersibility of the resin particles.

Also, the resin particle dispersion may be a resin particle dispersion obtained by granulating resin particles in the aqueous solvent. In a case where the resin particles are granulated in the aqueous solvent, the resin particle dispersion formed by polymerizing monomer components in an aqueous solvent may be prepared. In this case, a dispersion obtained by a known polymerization method may be used. For example, in a case where the resin particles are vinyl resin particles, a well-known polymerization method (a radical polymerization method such as emulsion polymerization, soap-free emulsion polymerization, suspension polymerization, miniemulsion polymerization, microemulsion polymerization) may be used.

For example, in a case where an emulsion polymerization method is used to prepare vinyl resin particles, the vinyl resin particles are obtained by adding monomers having a vinyl group such as styrene or (meth)acrylic acid to water, in which a water-soluble polymerization initiator such as potassium persulfate or ammonium persulfate is dissolved, optionally adding a surfactant such as sodium dodecyl sulfate or a diphenyl oxide disulfonate, and heating the components while stirring them. By using a monomer having an acidic group as the monomer component, it becomes a vinyl resin having an acidic group on the surface.

The method used in the resin particle dispersion forming step is not limited to the above-described method, and a commercially available resin particle dispersion which is dispersed in the aqueous solvent may be prepared. In the case of using the commercially available resin particle dispersion, an operation such as dilution with an aqueous solvent may be performed depending on the intended use. Further, the resin particle dispersion dispersed in the organic solvent may be substituted with an aqueous solvent within a range not affecting the dispersibility.

Polyimide Precursor Forming Step

Next, in the resin particle dispersion, tetracarboxylic dianhydride and a diamine compound are polymerized in the presence of the organic amine compound to form a resin (a polyimide precursor), and thereby a polyimide precursor solution is formed.

According to this method, since the aqueous solvent is applied, the productivity is high, and the polyimide precursor solution is prepared at the first stage, which is effective from the viewpoint of process simplification.

Specifically, an organic amine compound, a tetracarboxylic dianhydride, and a diamine compound are mixed into the resin particle dispersion which is prepared in the resin particle dispersion preparing step. Then, in the presence of the organic amine compound, the tetracarboxylic dianhydride and the diamine compound are polymerized to form a polyimide precursor in the resin particle dispersion. The order of mixing the organic amine compound, the tetracarboxylic dianhydride, and the diamine compound into the resin particle dispersion is not particularly limited.

At the time of polymerizing the tetracarboxylic dianhydride and the diamine compound in the resin particle dispersion in which the resin particles are dispersed, a polyimide precursor may be formed by using the aqueous solvent in the resin particle dispersion as it is. If necessary, an aqueous solvent may be newly mixed. In a case of newly mixing the aqueous solvent, the aqueous solvent may be an aqueous solvent containing a small amount of polar aprotic solvent. In addition, other additives may be mixed depending on the intended use.

Through the above-described steps, it is possible to obtain the polyimide precursor solution in which the resin particles are dispersed (the second polyimide precursor solution (the porous layer forming polyimide precursor solution)), and which contains the aqueous solvent, the resin particles (preferably, the resin particles having an acidic group on the surface), the organic amine compound, and the polyimide precursor.

Next, materials constituting the second polyimide precursor solution will be described.

Aqueous Solvent

Regarding the aqueous solvent, at the time of polymerizing tetracarboxylic dianhydride and a diamine compound in the resin particle dispersion, the aqueous solvent in the resin particle dispersion, which is used in preparing the resin particle dispersion, may be used as it is. In addition, at the time of polymerizing the tetracarboxylic dianhydride and a diamine compound, the aqueous solvent may be prepared so as to be suitable for the polymerization.

The aqueous solvent is an aqueous solvent including water. Specifically, the aqueous solvent may be a solvent including water which is 50% by weight or more with respect to the total aqueous solvent. Examples of the water include distilled water, ion exchange water, ultra filtered water, and pure water.

The content of water is preferably from 50% by weight to 100% by weight, is further preferably from 70% by weight to 100% by weight, and is still further preferably from 80% by weight to 100% by weight with respect to the entire aqueous solvent.

The aqueous solvent used at the time of preparing of the resin particle dispersion is an aqueous solvent including water. Specifically, the aqueous solvent for the resin particle dispersion may be an aqueous solvent including water in an amount of 50% by weight or more with respect to the total aqueous solvent. Examples of water include distilled water, ion exchange water, ultrafiltered water, and pure water. In addition, in a case of including organic solvents other than water, a water-soluble alcohol type solvent, for example, may be used. Note that, "water-soluble" denotes that 1% by weight or higher of a target substance is soluble in water at 25° C.

In a case where the aqueous solvent includes solvents other than water, examples of the solvents other than water include an aqueous organic solvent, and a polar aprotic solvent. As the solvents other than water, from the viewpoint of transparency, mechanical strength, and the like of the polyimide layer, a water-soluble organic solvent is preferable. Particularly, from the viewpoint of improving the properties of the polyimide layer, such as heat resistance, electrical properties, and solvent resistance in addition to the transparency and the mechanical strength, the aqueous solvent may include a polar aprotic solvent. In this case, in order to prevent the resin particles in the second polyimide precursor solution from, swelling or being dissolved, the content thereof may be 40% by weight or less, and is preferably 30% by weight or less with respect to the entire aqueous solvent. Further, in order to prevent resin particles from swelling and being dissolved when the second polyimide precursor solution is dried so as to form a layer, the content thereof may be from 5% by weight to 300% by weight, is preferably from 5% by weight to 250% by weight, is further preferably from 5% by weight to 200% by weight, with respect to the solid content of the polyimide precursor in the second polyimide precursor solution. Here, "water-soluble" denotes that 1% by weight or higher of a target substance is soluble in water at 25° C.

The water-soluble organic solvent may be used alone or two or more kinds thereof may be used in combination.

As the above-described water-soluble organic solvent, a water-soluble organic solvent in which the resin particles are not dissolved is preferable. The reason for this is that for example, in the case of using the aqueous solvent which includes the water and the water-soluble organic solvent, there is a concern that the resin particles are dissolved in the process of film formation even if the resin particles are not dissolved in the resin particle dispersion. However, it may be used in a range within the range where the resin particles may be prevented from being dissolved and swelling in the film formation process.

A water-soluble ether solvent is a water-soluble solvent having an ether bond in one molecule. Examples of the water-soluble ether solvent include tetrahydrofuran (THF), dioxane, trioxane, 1,2-dimethoxyethane, diethylene glycol dimethyl ether, and diethylene glycol diethyl ether. Among these, tetrahydrofuran or dioxane is preferable as the water-soluble ether solvent.

A water-soluble ketone solvent is a water-soluble solvent having a ketone group in one molecule. Examples of the water-soluble ketone solvent include acetone, methyl ethyl ketone, and cyclohexanone. Among these, acetone is preferable as the water-soluble ketone solvent.

A water-soluble alcohol solvent is a water-soluble solvent having an alcoholic hydroxyl group in one molecule. Examples of the water-soluble alcohol solvent include methanol, ethanol, 1-propanol, 2-propanol, tert-butyl alcohol, ethylene glycol, ethylene glycol monoalkyl ether, propylene glycol, propylene glycol monoalkyl ether, diethylene glycol, diethyene glycol monoalkyl ether, 1,2-propanediol, 1,3-propanediol, 1,3-butanediol,1,4-butanediol, 2,3-butanediol,1,5-pentanediol, 2-buten-1,4-diol, 2-methyl-2,4-pentanediol, glycerin, 2-ethyl-2-hydroxymethyl-1,3-propanediol, and 1,2,6-hexanetriol. Among these, as the water-soluble alcohol solvent, methanol, ethanol, 2-propanol, ethylene glycol, ethylene glycol monoalkyl ether, propylene glycol, propylene glycol monoalkyl ether, diethylene glycol, or diethylene glycol monoalkyl ether is preferable.

In a case where the polar aprotic solvent other than water is contained as the aqueous solvent, the polar aprotic solvent to be used in combination is a solvent in which a boiling point in a range from 150° C. to 300° C. and a dipole moment in a range from 3.0 D to 5.0 D. Specifically, examples of the polar aprotic solvent include N-methyl-2-pyrrolidone (NMP), N,N-dimethyl formamide (DMF), N,N-dimethyl acetamide (DMAc), dimethyl sulfoxide (DMSO), hexamethylene phosphoramide (HMPA), N-Methyl caprolactam, N-acetyl-2-pyrrolidone, 1,3-dimethyl-2-imidizolidinone (DMI), N,N'-dimethyl propylene urea, trimethylurea, trimethyl phosphate, and triethyl phosphate.

Note that, in a case where a solvent other than water is contained as the aqueous solvent, the solvent to be used in combination has a boiling point which may be 270° C. or less, is preferably from 60° C. to 250° C., and is further preferably from 80° C. to 230° C. When the boiling point of the solvent to be used in combination is within the above range, the solvent other than water is less likely to remain on the polyimide layer, and a polyimide layer having high mechanical strength is likely to be obtained.

Here, the range in which the polyimide precursor is dissolved in the solvent is controlled by the content of water, and the kind and amount of the organic amine compounds. In a range where the content of water is small, the polyimide precursor is likely to be dissolved in an area where the content of the organic amine compound is small. In contrast, in a range where the content of water is large, the polyimide precursor is likely to be dissolved in an area where the content of the organic amine compounds is large. Further, in a case where the organic amine compound has high hydrophilicity, that is, the organic amine compound has a hydroxyl group, the polyimide precursor is likely to be dissolved in an area where the content of water is large.

Resin Particles

The resin particles are not particularly limited as long as those are not dissolved not only in the aqueous solvent, but also in the polyimide precursor solution, and examples thereof include resin particles formed of resins other than polyimide. Examples of the resin particles include resin particles obtained by polymerization of polymerizable monomers such as a polyester resin or a urethane resin, and resin particles obtained by radical polymerization of polymerizable monomers such as a vinyl resin, an olefin resin, or a fluorine resin. Examples of the resin particles obtained by radical polymerization include resin particles of a (meth)acrylic resin, a (meth)acrylic resin, a styrene-(meth)acrylate resin, a polystyrene resin, a polyethylene resin, and the like.

Among them, it is preferable that the resin particles are formed of at least one kind selected from the group consisting of a (meth)acrylic resin, a (meth)acrylate resin, a styrene-(meth)acrylic resin, and a polystyrene resin.

In addition, the resin particles may be cross-linked or may be not cross-linked. From the viewpoint that the resin particles effectively contribute to relaxation of the residual stress in the step of imidizing the polyimide precursor, it is preferable that the resin particles are not cross-linked. Further, from the viewpoint of simplifying the steps of preparing the second polyimide precursor solution, the resin particle dispersion is preferably a resin particle dispersion obtained through the emulsion polymerization.

Note that, in the exemplary embodiment, "(meth)acryl" represents both "acryl" and "methacryl".

In a case where the resin particles are vinyl resin particles, it is possible to obtain the resin particles by polymerizing the monomers. Examples of monomers of the vinyl resin include the following monomers. Examples of the monomers of the vinyl resin include a vinyl resin unit obtained by polymerization of the following monomers including: styrenes having a styrene skeleton such as styrene, an alkyl-substituted styrene (for example, α-methylstyrene, 2-methylstyrene, 3-methylstyrene, 4-methylstyrene, 2-ethylstyrene, 3-ethylstyrene, or 4-ethylstyrene), a halogen-substituted styrene (for example, 2-chlorostyrene, 3-chlorostyrene, or 4-chlorostyrene), or vinylnaphthalene; esters having a vinyl group such as methyl (meth)acrylate, ethyl (meth)acrylate, n-propyl (meth)acrylate, n-butyl (meth)acrylate, lauryl (meth)acrylate, 2-ethylhexyl (meth)acrylate, or trimethylolpropane trimethacrylate (TMPTMA); vinyl nitriles such as acrylonitrile or methacrylonitrile; vinyl ethers such as vinyl methyl ether or vinyl isobutyl ether; vinyl ketones such as vinyl methyl ketone, vinyl ethyl ketone or vinyl isopropenyl ketone; acids such as (meth)acrylic acid, maleic acid, cinnamic acid, fumaric acid, or vinylsulfonic acid; and bases such as ethyleneimine, vinylpyridine, or vinylamine.

Examples of other monomers which may be used in combination include: monofunctional monomers such as vinyl acetate; bifunctional monomers such as ethylene glycol dimethacrylate, nonane diacrylate, or decanediol diacrylate; and polyfunctional monomers such as trimethylolpropane triacrylate or trimethylolpropane trimethacrylate.

The vinyl resin may be a resin which is obtained using one monomer among the above-described monomers, or may be a copolymer which is obtained using two or more monomers among the above-described monomers.

An acidic group on the surface of the resin particle is not particularly limited, but may be at least one selected from the group consisting of a carboxy group, a sulfonic acid group, and a phenolic hydroxyl group. Among them, a carboxy group is preferable.

A monomer having an acidic group on the surface of the resin particle is not particularly limited as long as it is a monomer having an acidic group. Examples thereof include a monomer having a carboxy group, a monomer having a sulfonic acid group, a monomer having a phenolic hydroxyl group, and salts thereof.

Specifically, examples thereof include a monomer having a sulfonic acid group such as p-styrene sulfonic acid and 4-vinylbenzene sulfonic acid; a monomer having a phenolic hydroxyl group such as 4-vinyl dihydrocinnamic acid, 4-vinylphenol, and 4-hydroxy-3-methoxy-1-propenyl benzene; a monomer carboxy group such as acrylic acid, crotonic acid, methacrylic acid, 3-methyl crotonic acid, fumaric acid, maleic acid, 2-methyl isocrotonic acid, 2,4-hexadiene diacid, 2-pentenoic acid, sorbic acid, citraconic acid, 2-hexenoic acid, and monoethyl fumarate; and salts thereof. The monomers having such an acidic group may be polymerized by being mixed with monomers having no acidic group, or the monomers having an acidic group on the surface may be polymerized after-polymerizing and granulating the monomers having no acidic group. The monomers may be used alone, or two or more kinds thereof may be used in combination.

Among them, the monomers having a carboxy group of acrylic acid, crotonic acid, methacrylic acid, 3-methylcrotonic acid, fumaric acid, maleic acid, 2-methylisocrotonic acid, 2,4-hexadiene diacid, 2-pentenoic acid, sorbic acid, citraconic acid, 2-hexene, monoethyl fumarate, and the like, and salts thereof. The monomers having a carboxy group may be used alone or two or more kinds thereof may be used in combination.

That is, the resin particles having an acidic group on the surface preferably has a skeleton derived from a monomer having at least one carboxy group selected from the group consisting of acrylic acid, crotonic acid, methacrylic acid, 3-methylcrotonic acid, fumaric acid, maleic acid, 2-methylisocrotonic acid, 2,4-hexadiene diacid, 2-pentenoic acid, sorbic acid, citraconic acid, 2-hexene, monoethyl fumarate, and the like, and salts thereof.

In a case where the monomers having an acidic group and the monomers having no acidic group are mixed so as to be polymerized, the amount of the monomers having an acidic group is not particularly limited; however, when the amount of the monomers having an acidic group is excessively small, the dispersibility of the resin particles in the second polyimide precursor solution may be deteriorated. On the other hand, when the amount of the monomers having an acidic group is excessively large, an aggregate of the polymer may be formed at the time of the emulsion polymerization. For this reason, the amount of the monomers having an acidic group is preferably from 0.3% by weight to 20% by weight, is further preferably from 0.5% by weight to 15% by weight, and is particularly preferably from 0.7% by weight to 10% by weight, with respect to the entire monomers.

Meanwhile, in a case where the polymerization is performed by adding the monomers having an acidic group after the monomers having no acidic group is subjected to the emulsion polymerization, from the same viewpoint as described above, the amount of the monomer having an acidic group is preferably from 0.01% by weight to 10% by weight, is further preferably from 0.05% by weight to 7% by weight, and is particularly preferably from 0.07% by weight to 5% by weight, with respect to the entire monomers.

As described above, it is preferable that the resin resin particles are not cross-linked, in a case where a crosslinking agent is used as at least a portion of the monomer components, the ratio of the crosslinking agent to the entire monomer components is preferably from 0% by weight to 20% by weight, is further preferably from 0% by weight to 5% by weight, and is particularly preferably 0% by weight.

In a case where the monomer used in the resin forming the vinyl resin particles contains styrene, the ratio of the styrene to the entire monomer components is preferably from 20% by weight to 100% by weight, and is further preferably from 40% by weight to 100% by weight.

Average Particle Diameter of Resin Particles

The volume average particle diameter of the resin particles is not particularly limited. For example, it may be 2.5 µm or less, is preferably 2.0 µm or less, and is further preferably 1.0 µm or less. A lower limit thereof is not particularly limited, but may be 0.001 µm or more, is preferably 0.005 µm or more, and is further preferably 0.01 µm or more.

In order to obtain the average particle diameter of the resin particles, a volume cumulative distribution is drawn on divided particle diameter ranges (channels) in order from the smallest particle diameter by using a particle diameter distribution which is obtained from measurement of a laser diffraction particle diameter distribution analyzer (for example, LA-700 manufactured by HORIBA, Ltd.), and then a particle diameter having a cumulative value of 50% with respect to all the particles is defined as a volume average particle diameter D50v.

The resin particles may be those obtained by polymerizing a monomer having an acidic group on the surface of a commercially available product. Specifically, examples of the cross-linked resin particles include cross-linked polymethyl methacrylate (MBX-series, prepared by Sekisui Plastics Co., Ltd), cross-linked polystyrene (SBX-series, prepared by Sekisui Plastics Co., Ltd), and cross-linked resin particles of copolymerization of methyl methacrylate and styrene (MSX-series, prepared by Sekisui Plastics Co., Ltd).

In addition, examples of non-cross-linked resin particles include polymethyl methacrylate (MB-series, prepared by Sekisui Plastics Co., Ltd), and a (meth)acrylate-styrene copolymer (FS-series, prepared by Nippon Paint Co., Ltd).

In the second polyimide precursor solution, the content of the resin particles may be from 20% by weight to 600% by weight (preferably from 25% by weight to 550% by weight, and is further preferably from 30% by weight to 500% by weight) with respect to 100 parts by weight of the solid content of the polyimide precursor in the second polyimide precursor solution.

Polyimide Precursor

The polyimide precursor may be obtained by polymerizing tetracarboxylic dianhydride and a diamine compound. Specifically, the polyimide precursor is a resin (polyamic acid) having a repeat unit represented by formula (I).

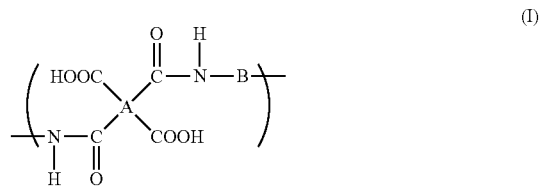

In formula (I), A represents a tetravalent organic group, and B represents a divalent organic group.

Here, in formula (I), the tetravalent organic group represented by A is a residue obtained by removing four carboxy groups from tetracarboxylic dianhydride as a raw material.

On the other hand, the divalent organic group represented by B is a residue obtained by removing two amino groups from the diamine compound as a raw material.

That is, the polyimide precursor having a repeating unit represented by formula (I) is a polymer obtained by polymerization of tetracarboxylic dianhydride and the diamine compound.

Examples of the tetracarboxylic dianhydride include an aromatic compound and an aliphatic compound. Among these, an aromatic compound is preferable. That is, it is preferable that the tetravalent organic group represented by A in formula (I) is an aromatic organic group.

Examples of the aromatic tetracarboxylic dianhydride include pyromellitic dianhydride, 3,3',4,4'-benzophenone tetracarboxylic dianhydride, 3,3',4,4'-biphenyl sulfone tetracarboxylic dianhydride, 1,4,5,8-naphthalene tetracarboxylic dianhydride,2,3,6,7-naphthalene tetracarboxylic dianhydride, 3,3',4,4'-biphenyl ether tetracarboxylic dianhydride, 3,3',4,4'-dimethyldiphenyl silane tetracarboxylic dianhydride, 3,3',4,4'-tetraphenyl silane tetracarboxylic dianhydride, 1,2,3,4-furan tetracarboxylic dianhydride, 4,4'-bis(3,4-dicarboxyphenoxy)diphenyl sulfide dianhydride, 4,4'-bis(3,4-dicarboxyphenoxy)diphenyl sulfone dianhydride, 4,4'-bis(3,4-dicarboxyphenoxy)diphenyl propane dianhydride, 3,3',4,4'-perfluoroisopropylidene diphthalic dianhydride, 3,3',4,4'-biphenyl tetracarboxylic dianhydride, 2,3,3',4'-biphenyl tetracarboxylic dianhydride, bis(phthalic acid)phenyl phosphine oxide dianhydride, p-phenylene-bis(triphenyl phthalic acid)dianhydride, m-phenylene-bis(triphenyl phthalic acid)dianhydride, bis(triphenyl phthalic acid)-4,4'- diphenyl ether dianhydride, and bis(triphenyl phthalic acid)-4,4'-diphenylmethane dianhydride.

Examples of the aliphatic tetracarboxylic dianhydride include an aliphatic or alicyclic tetracarboxylic dianhydride such as butane tetracarboxylic dianhydride, 1,2,3,4-cyclobutane tetracarboxylic dianhydride, 1,3-dimethyl-1,2,3,4-cyclobutanetetracarboxylic dianhydride, 1,2,3,4-cyclopentane tetracarboxylic dianhydride, 2,3,5-tricarboxycyclopentyl acetic dianhydride, 3,5,6-tricarboxynobornane-2-acetic dianhydride, 2,3,4,5-tetrahydrofuran tetracarboxylic dianhydride, 5-(2,5-dioxotetrahydrofuryl)-3-methyl-3-cyclohexene-1,2-di carboxylic dianhydride, or bicyclo[2,2,2]-oct-7-ene-2,3,5,6-tetracarboxylic dianhydride; and an aliphatic tetracarboxylic dianhydride having an aromatic ring such as 1,3,3a,4,5,9b-(hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho-[1,2-c]furan-1,3-dione, or 1,3,3a,4,5,9b-hexanydro-8-methyl-5-(tetrahydro-2,5-dioxo-3-furanyl)-naphtho[1,2-c]furan-1,3-dione.

Among these, as the tetracarboxylic dianhydride, an aromatic tetracarboxylic dianhydride is preferable. Specifically, for example, pyromellitic dianhydride, 3,3',4,4'-biphenyl tetracarboxylic dianhydride, 2,3,3',4'-biphenyl tetracarboxylic dianhydride, 3,3',4,4'-biphenyl ether tetracarboxylic dianhydride, or 3,3',4,4'-benzophenone tetracarboxylic dianhydride is preferable, pyromellitic dianhydride, 3,3',4,4'-biphenyl tetracarboxylic dianhydride, or 3,3',4,4'-benzophenone tetracarboxylic dianhydride is further preferable, and 3,3',4,4'-biphenyl tetracarboxylic dianhydride is still further preferable.

Among these tetracarboxylic dianhydrides, one kind may be used alone, or two or more kinds may be used in combination.

In a case where two or more tetracarboxylic dianhydrides are used in combination, a combination of aromatic tetracarboxylic dianhydrides, a combination of aliphatic tetracarboxylic dianhydrides, or a combination of an aromatic tetracarboxylic dianhydride and an aliphatic tetracarboxylic dianhydride may be used.

On the other hand, the diamine compound is a diamine compound having two amino groups in a molecular structure thereof. Examples of the diamine compound include an aromatic compound and an aliphatic compound. Among these, an aromatic compound is preferable. That is, it is preferable that the divalent organic group represented by B in formula (I) is an aromatic organic group.

Examples of the diamine compound include: an aromatic diamine such as p-phenylenediamine, m-phenylenediamine, 4,4'-diaminodiphenylmethane, 4,4'-diaminodiphenylethane, 4,4'-diaminodiphenylether, 4,4'-diaminodiphenylsulfide, 4,4'-diaminodiphenylsulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenylether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)-biphenyl, 1,3'-bis(4-aminophenoxy)benzene, 9,9-bis(4-aminophenyl)fluorene, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, or 4,4'-bis[4-(4-amino-2-trifluoromethyl)phenoxy]-octafluorobiphenyl; an aromatic diamine having two amino groups bonded to an aromatic ring and hetero atoms other than nitrogen atoms of the amino groups, such as diaminotetraphenyl thiophene; and an aliphatic or alicyclic diamine such as 1,1-metaxylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylene dimethylenediamine, tricyclo[6,2,1,0$^{2.7}$]-undecylene dimethyldiamine, or 4,4'-methylenebis(cyclohexylamine).

Among them, as the diamine compound, an aromatic diamine compound may be used. Specifically, p-phenylenediamine, m-phenylenediamine, 4,4'-diaminodiphenyl methane, 4,4'-diaminodiphenyl ether, 3,4'-diaminodiphenyl ether, 4,4'-diaminodiphenyl sulfide, and 4,4'-diaminodiphenyl sulfone may be used, and particularly, 4,4'-diaminodiphenyl ether and p-phenylenediamine may be used.

The diamine compounds may be used alone, or two or more kinds thereof may be used in combination. In addition, in a case where two or more diamine compounds are used in combination, a combination of aromatic diamine compounds, a combination of aliphatic diamine compounds, or a combination of an aromatic diamine compound and an aliphatic diamine compound may be used.

The number average molecular weight of the polyimide precursor is preferably from 1,000 to 150,000, is further preferably from 5,000 to 130,000, and is still further preferably from 10,000 to 100,000.

When the number average molecular weight of the polyimide precursor is within the above range, deterioration in the solubility of the polyimide precursor in the solvent is prevented, and film forming properties are easily secured.

The number average molecular weight of the polyimide precursor is measured using gel permeation chromatography (GPC) under the following measurement conditions.

Column: Tosoh TSKgel α-M (7.8 mm, I.D.×30 cm)
Eluent: dimethyl formamide (DMF)/30 mM LiBr/60 mM phosphoric acid
Flow rate: 0.6 mL/min
Injection amount: 60 μL
Detector: a differential refractometer (RI)

The content (density) of the polyimide precursor may be from 0.1% by weight to 40% by weight, is preferably from 0.5% by weight to 25% by weight, and is further preferably from 1% by weight to 20% by weight, with respect to the second polyimide precursor solution.

Organic Amine Compound

The organic amine compound is a compound which forms an amine salt with the polyimide precursor (a carboxy group thereof) to improve the solubility of the aqueous solvent thereof and which also functions as an imidization promoter. Specifically, it is preferable that the organic amine compound is an amine compound having a molecular weight of 170 or lower. It is preferable that the organic amine compound is a compound other than the diamine compound which is the raw material of the polyimide precursor.

The organic amine compound may be a water-soluble compound. "Water-soluble" denotes that 1% by weight or higher of a target material is soluble in water at 25° C.

Examples of the organic amine compound include a primary amine compound, a secondary amine compound, and a tertiary amine compound.

Among these, as the organic amine compound, at least one (particularly, the tertiary amine compound) selected from the group consisting of the secondary amine compound and the tertiary amine compound may be used. When the tertiary amine compound or the secondary amine compound (particularly, the tertiary amine compound) is used as the organic amine compound, the solubility of the polyimide precursor in the solvent is likely to be improved, the film, forming properties are likely to be improved, and the storage stability of the second polyimide precursor solution is likely to be improved.

In addition, examples of the organic amine compound include a monovalent amine compound and a divalent or higher polyvalent amine compound. In a case where the divalent or higher polyvalent amine compound is used, a pseudo-cross-linked structure is likely to be formed between molecules of the polyimide precursor, and the storage stability of the second polyimide precursor solution is likely to be improved.

Examples of the primary amine compound include methylamine, ethylamine, n-propylamine, isopropylamine, 2-ethanolamine, and 2-amino-2-methyl-1-propanol.

Examples of the secondary amine compound include dimethylamine, 2-(methylamino)ethanol, 2-(ethylamino) ethanol, and morpholine.

Examples of the tertiary amine compound include 2-dimethyl aminoethanol, 2-diethyl aminoethanol, 2-dimethyl aminopropanol, pyridine, triethylamine, picoline, N-methyl morpholine, N-ethyl morpholine, 1,2-dimethyl imidazole, and 2-ethyl-4-methyl imidazole.

From the viewpoints of the pot life of the second polyimide precursor solution and the film thickness uniformity, the tertiary amine compound is preferable. From these viewpoints, it is further preferable that the organic amine compound is at least one kind selected from, the group consisting of 2-dimethyl aminoethanol, 2-diethyl aminoethanol, 2-dimethyl aminopropanol, pyridine, triethylamine, picoline, N-methyl morpholine, N-ethyl morpholine, 1,2-dimethyl imidazole, 2-ethyl-4-methyl imidazole, N-methyl piperidine, and N-ethyl piperidine.

Here, from the viewpoint of film forming properties, as the organic amine compound, an amine compound, (particularly, the tertiary amine compound) having a nitrogen-containing heterocyclic structure is also preferable. Examples of the amine compound having a nitrogen-containing heterocyclic structure (hereinafter, referred to as "nitrogen-containing heterocyclic amine compound") include isoquinolines (amine compounds having an isoquinoline skeleton), pyridines (amine compounds having a pyridine skeleton), piperidines (amine compounds having a piperidine skeleton), pyrimidines (amine compounds having a pyrimidine skeleton), pyrazines (amine compounds having a pyrazine skeleton), piperazines (amine compounds having a piperazine skeleton), triazines (amine compounds having a triazine skeleton), imidazoles (amine compounds having an imidazole skeleton), morpholines (amine compounds having a morpholine skeleton), polyaniline, polypyridine, and polyamine.

From the viewpoint of film forming properties, the nitrogen-containing heterocyclic amine compound is preferably at least one kind selected from the group consisting of morpholines, pyridines, piperidines, and imidazoles, and is further preferably morpholines (an amine compound having a morpholine skeleton). Among them, at least one kind selected from the group consisting of N-methyl morpholine, N-methyl piperidine, pyridine, 1,2-dimethyl imidazole, 2-ethyl-4-methyl imidazole, and picoline is further preferable, and N-methyl morpholine is still further preferable.

Among these, it is preferable that the organic amine compound, is a compound having a boiling point of 60° C. or higher (preferably from 60° C. to 200° C., and further preferably from 70° C. to 150° C.). In a case where the boiling point, of the organic amine compound is 60° C. or higher, the volatilization of the organic amine compound from the second polyimide precursor solution is prevented during storage, and deterioration in the solubility of the polyimide precursor in the solvent is likely to be prevented.

The content of the organic amine compound may be from 50% by mol to 500% by mol, is preferably from 80% by mol to 250% by mol, and is further preferably from 90% by mol to 200% by mol with respect to the amount, of carboxy groups (—COOH) of the polyimide precursor in the second polyimide precursor solution.

In a case where the content, of the organic amine compound is in the above-described range, the solubility of the polyimide precursor in the solvent is likely to be increased, and film forming properties are likely to be improved. In addition, the storage stability of the second polyimide precursor solution is likely to be improved.

The organic amine compounds may be used alone or two or more kinds thereof may be used in combination.

Ratio of Resin Particles to Polyimide Precursor

In the second polyimide precursor solution, at a weight ratio in a case where the solid content of the second polyimide precursor solution is set 100, the ratio of the resin particles to the polyimide precursor may be in a range of from solid content of polyimide precursor solution: resin particles=100:20 to 100:600, is preferably from 100:25 to 100:550, and is further preferably from 100:30 to 100:500. By adjusting this ratio, the aperture ratio may be arbitrarily set.

Other Additives

The second polyimide precursor solution may include a catalyst for promoting the imidization reaction or a leveling agent for improving the quality of the film.

As the catalyst for promoting the imidization reaction, for example, a dehydrating agent such as an acid anhydride, or an acid catalyst such as a phenol derivative, a sulfonic acid derivative, or a benzoic acid derivative may be used.

In addition, depending on the intended use of the porous polyimide film, the second polyimide precursor solution may include, for example, a conductive material (which is conductive (for example, a volume resistivity of lower than $10^7$ Ω·cm) or semiconductive (for example, a volume resistivity of from $10^7$ Ω·cm to $10^{13}$ Ω·cm)) to impart conductivity.

Examples of the conductive material include: carbon blacks (for example, an acidic carbon black having a pH value of 5.0 or lower); metals (for example, aluminum or nickel); metal oxides (for example, yttrium oxide or tin oxide); and ion-conductive materials (for example, potassium titanate or LiCl). These conductive materials may be used alone, or two or more kinds may be used in combination.

In addition, depending on the intended use of the porous polyimide film, the second polyimide precursor solution may include inorganic particles which are added to improve the mechanical strength. Examples of the inorganic particles include particulate materials such as silica powder, alumina powder, barium sulfate powder, titanium oxide powder, mica, or talc.

Step of Preparing the First Polyimide Precursor Solution

The material used for the first polyimide precursor solution (the filling layer forming polyimide precursor solution) is not particularly limited as long as it contains the solvent and the polyimide precursor.

For example, regarding a solvent, the aqueous solvent is preferably used for the second polyimide precursor solution, at the time of forming a second film on the first film, and thus it is preferable to use a solvent mainly composed of an organic solvent from the viewpoints of prevention of dissolution and swelling, prevention of disturbance of the interface, prevention of void generation, and the like.

As the organic solvent, a known solvent may be used without limitation, and examples thereof include an organic solvent such as N-methyl-2-pyrrolidone (NMP), N,N-dimethyl formamide (DMF), N,N-dimethyl acetamide (DMAc), dimethyl sulfoxide (DMSO), hexamethylene phosphoramide (HMPA), N-methyl caprolactam, N-acetyl-2-pyrrolidone, 1,3-dimethyl-2-imidizolidinone (DMI), N,N'-dimethyl propylene urea, tetramethyl urea, trimethyl phosphate, triethyl phosphate, acetone, tetrahydrofuran, methanol, ethylene glycol, ethylene glycol dimethyl ether, and anisole.

Note that, in the first polyimide precursor solution (the filling layer forming polyimide precursor solution), it is preferable that the resin particles described in the section of "step of preparing the second polyimide precursor solution" are not contained. In addition, even in a case where the resin particles are contained, the amount thereof is set such that the volume ratio is 5% or less after film formation.

As the polyimide precursor, any existing material may be used, and examples thereof include the polyimide precursor described in the section of "step of preparing the second polyimide precursor solution".

In a case where the filling layer has a gas separation function, 6FDA polyimide [(6FDA polyimide obtained by a condensation reaction of 5,5'-2,2,2-trifluoro-1-(trifluoromethyl) ethylidene-bis-1,3-isobenzofurandione (6FDA) and aromatic diamine (for example, 1,3-diaminobenzene))], and polyimide described in "high-performance of polyimide and application technology (published by Science & Technology, P. 283-291 (2008))" are used.

In addition, in a case where strength is imparted to the filling layer, a polyimide resin obtained from at least one kind of pyromellitic dianhydride, and 3,3',4,4'-biphenyl tetracarboxylic dianhydride, and at least one kind of p-phenylenediamine, m-phenylenediamine, and 4,4'-diaminodiphenyl ether is preferably used.

Further, in a case where the filling layer directly contacts the porous layer and adhesiveness is imparted to interfaces of both of the filling layer and the porous layer, the same polyimide resin (that is, the polyimide resin synthesized from the same monomer) is preferably used in the filling layer and the porous layer.

In addition, the organic amine compound and other additives which are described in the section of "step of preparing the second polyimide precursor solution" may be contained in the first polyimide precursor solution.

First Film Forming Step

In the first film forming step, the substrate is coated with the first polyimide precursor solution so as to form a coated film.

Examples of the substrate include a resin substrate; a glass substrate; a ceramic substrate; a metal substrate; and a composite material substrate obtained by combining the above-described materials with each other. A release layer subjected to the release treatment, may be provided as the substrate.

In addition, a method of applying the first polyimide precursor solution to the substrate is not particularly limited. Examples of the method include various methods such as a spray coating method, a spin coating method, a roll coating method, a bar coating method, a slit die coating method, or an ink jet coating method.

As the substrate, various substrates may be used according to the intended use. For example, various substrates applied to liquid crystal elements such as a semiconductor substrate on which integrated circuits are formed, a wiring substrate on which wirings are formed, a printed substrate provided with electronic parts and wirings, a substrate for electric wire covering materials; a resin substrate such as polystyrene or polyethylene terephthalate; a glass substrate; a ceramic substrate; a metal substrate such as iron or stainless steel (SUS); and a composite material substrate obtained by combining the above-described materials with each other. Optionally, a release layer subjected to the release treatment with a silicone or fluorine release agent may be provided as the substrate.

Heating Step

Next, a drying treatment is performed on the coated film obtained in the above-described coated film forming step. Through this drying treatment, a first film (a polyimide film in the case of using a dried film before imidization, or a solvent-soluble polyimide) is formed.

The heating conditions of the drying treatment may include, for example, a temperature in a range from 30° C. to 200° C. and a time in a range from 10 minutes to 60 minutes, and the higher the temperature, the shorter the heating time may be. It is also effective to apply hot air at the time of heating. At the time of heating, the temperature may be raised stepwise or may be raised without changing the speed. At this time, the drying may be performed such that the amount of the solvent remaining on the film is from 200% by weight to 2% by weight, preferably from 150% by weight to 5% by weight, further preferably from 100% by weight to 5% by weight, still further preferably from 100% by weight to 10% by weight, with respect to the weight of the polyimide precursor. When the amount of the remaining solvent is excessively large, the disturbance of the interface at the time of forming an upper layer, and the dissolution and swelling of the resin particles may occur, and the shape of the pore is likely to be disturbed; on the other hand, when the amount of the remaining solvent is excessively small, flaking between laminated films is likely to occur in some cases.

Second Film Forming Step, Imidizing Step, Resin Particle Removing Step

Second Film Forming Step

A second film forming step is a step of forming a second film on the first film which is formed in the first film forming step with the second polyimide precursor solution. In addition, after the second film forming step, a step of removing the resin particles is performed. Through the step of removing the resin particles, it is possible to obtain a laminated film including a porous polyimide layer (porous layer) and a non-porous polyimide layer (the filling layer). Note that, a step of removing the resin particles from the first film and the second film may be performed at the same time.

First, the first film is coated with the second polyimide precursor solution. As a coating method, the same method as that used in the first film forming step may be used.

Further, a drying treatment is performed on the laminated film. With this drying treatment, a film in which the first film and the second film are laminated (dried film before imidization) is formed.

The heating conditions for the drying treatment are, for example, a temperature in a range from 30° C. to 200° C. and a heating time in a range from 10 minutes to 60 minutes, and the higher the temperature, the shorter the heating time may be. It is also effective to apply hot air during heating. In the case of heating, the temperature may be raised stepwise or may be raised without changing the speed.

Imidizing Step

Next, an imidizing step is performed.

For example, imidization proceeds by concurrently or separately heating the laminated films of the first and second films. The temperature and time of the heating are adjusted according to the type of resin, the degree of imidization, and the like. As the imidization progresses and the imidization rate increases, it becomes difficult to dissolve in the organic solvent.

The heating method in the imidizing step is not particularly limited. For example, examples thereof include a method of heating in two stages. In a case of heating in two stages, specifically, the following heating conditions are exemplified.

As the heating condition at the first stage, it is preferable that the temperature at which the shape of the resin particles is maintained. Specifically, the temperature may be in a range from 50° C. to 150° C., and is preferably from 60° C. to 140° C. Further, the heating time may be from 10 minutes to 60 minutes. The higher the heating temperature, the shorter the heating time may be.

As the heating condition at the second stage, for example, the heating temperature is from 150° C. to 450° C. (preferably, 200° C. to 430° C.), and the heating time is from 20 minutes to 120 minutes. When the heating conditions are set to be within the above range, the imidization reaction further progresses, and a laminated film of the polyimide may be formed. At the time of the heating reaction, the temperature may be raised stepwise or slowly at a constant rate before reaching the final temperature of heating.

Note that, the heating conditions are not limited to the two-stage heating method as described above, and for example, a one-stage heating method may be adopted. In the case of the one-stage heating method, for example, the imidization may be completed only by the heating conditions as indicated in the second stage.

Note that, from the viewpoint of increasing the area ratio of the pores in the porous polyimide layer, it is preferable that the resin particles are in a state of being exposed through a treatment of exposing the resin particles. The treatment of exposing the resin particles is preferably performed after the step of imidizing the polyimide precursor (imidizing step), or after imidization and before the step of removing the resin particles.

The treatment of exposing the resin particles is performed when the second film is in the following state.

In a case where the treatment of exposing the resin particles when the imidization ratio of the polyimide precursor in the second film is less than 10% (that is, a state where the polyimide film is soluble in water), for example, a wiping treatment or a treatment of dipping the film in water may be used as the treatment of exposing the resin particles embedded in the second film.

In addition, in a case where the treatment of exposing the resin particles is performed when the imidization ratio of the polyimide precursor in the second film is 10% or higher (that is, a state where the polyimide film is not likely to be dissolved in an organic solvent) and when the imidization of the second film is completed, for example, a method of exposing the resin particles by mechanically cutting the film using a tool such as sand paper, or a method of exposing the resin particles by decomposing the film using a laser or the like may be exemplified.

For example, in a case where the mechanical cutting method is used, some of resin particles which are present in an upper region of the second film (that is, a region of the resin particle layer on a side distant from the substrate) embedded in the second film are cut together with the polyimide film present above the resin particles, and the cut resin particles are exposed from the surface of the second film.

Step of Removing Resin Particles

Next, a step of removing the resin particles will be described.

In the step of removing the resin particles, the resin particles may be removed in the step of heating the laminated film of the first and second films and imidizing the polyimide precursor, or may be removed from the laminated film after imidization (after imidizing step).

The step of removing the resin particles is preferably performed when the imidization ratio of the polyimide precursor in the polyimide film is 10% or more, from, the viewpoint of the removability of the resin particles, in the step of imidizing the polyimide precursor. When the imidization ratio is 10% or more, the polyimide precursor is not likely to be dissolved, in the organic solvent, and the form thereof is likely to be maintained.

Examples of the method of removing the resin particles include a method of removing the resin particles by heating, a method of removing the resin particles using the organic solvent for dissolving the resin particles, and a method of removing the resin particles by decomposition with a laser or the like. Among them, the method of removing the resin particles by heating, and the method of removing the resin particles using an organic solvent for dissolving the resin particles are preferably used.

In the method of removing by the heating, for example, the resin particles may be removed by decomposition by the heating for progressing imidization in the step of imidizing the polyimide precursor. In this case, there is no operation for removing the resin particles by the solvent, which is effective in reducing the number of process.

On the other hand, depending on the kinds of the resin particles, cracked gas may be produced due to the heating, and this cracked gas may cause fracture or crack. For this reason, in this case, the method of removing the resin particles using an organic solvent for dissolving the resin particles is preferably used.

Examples of the method of removing the resin particles using an organic solvent for dissolving the resin particles include a method of bringing the resin particles into contact with an organic solvent for dissolving the resin particles (for example, dipping the resin particles in the solvent) to dissolve the resin particle therein. It is preferable that the resin particles are dipped in the solvent in the above-described state from the viewpoint of increasing the dissolution efficiency of the resin particles.

The organic solvent for dissolving the resin particles to be removed is not particularly limited as long as the first and second films and the imidized laminated film are insoluble therein and the resin particles are soluble therein. Examples of the organic solvent include: ethers such as tetrahydrofuran; aromatic solvents such as toluene; ketones such as acetone; and esters such as ethyl acetate.

The substrate which is used in the first film forming step may be separated from the film when the film is dried, when the polyimide precursor in the first and second films is not likely to be dissolved in an organic solvent, or when a laminated film in which the imidization is completed is formed.

Through the above-described steps, the polyimide laminated film including a porous polyimide layer (the porous layer) and a non-porous polyimide layer (the filling layer) is formed. In addition, it may also be used as a laminated film integrated with the substrate without flaking. Further, the polyimide laminated film may be subjected to post-processing such as forming a conductive layer of copper, aluminum or the like depending on the intended use.

Here, the imidization ratio of the polyimide precursor will be described.

Examples of a partially imidized polyimide precursor include precursors having repeating units represented by formulae (I-1), (I-2), and (I-3).

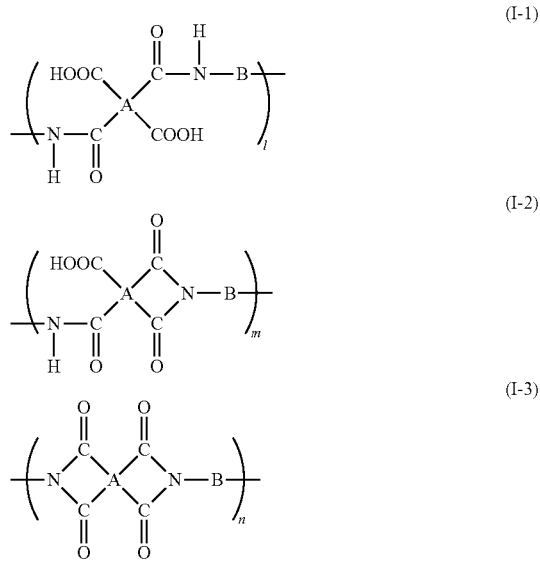

In formulae (I-1), (I-2), and (I-3), A represents a tetravalent organic group, and B represents a divalent organic group. l represents an integer of 1 or more, and m and n each independently represent an integer of 0 or 1 or more.

Note that, A and B have the same definitions as those of A and B in formula (I) described below.

The imidization ratio of the polyimide precursor denotes a ratio of the number (2n+m) of binding sites of the polyimide precursor (reaction sites between tetracarboxylic dianhydride and the diamine compound) where an imide ring is closed to the total number (2l+2m+2n) of binding sites of the polyimide precursor. That is, the imidization ratio of the polyimide precursor is represented by "(2n+m)/(2l+2m+2n)".

The imidization ratio (the value of "(2n+m)/(2l+2m+2n)") of the polyimide precursor is measured using the following method.

Measurement of Imidization Ratio of Polyimide Precursor
Preparation of Polyimide Precursor Sample (i) A polyimide precursor composition as a measurement, target is applied to a silicon wafer in a thickness range from 1 μm to 10 μm to prepare a coated, film, sample.

(ii) The coated film, sample is dipped in tetrahydrofuran (THF) for 20 minutes such that a solvent in the coated film sample is replaced with tetrahydrofuran (THF). The solvent for dipping is not limited to THF and may be selected from solvents in which, the polyimide precursor is insoluble and which may be mixed with the solvent component contained in the polyimide precursor composition. Specifically, an alcohol solvent such as methanol or ethanol, or an ether compound such, as dioxane may be used.

(iii) The coated film sample is extracted from THF, and $N_2$ gas is blown to THF attached to the surface of the coated film sample to remove THF from the coated film sample. The coated film sample is dried under reduced pressure of 10 mmHg or lower at 5° C. to 25° C. for 12 hours or longer to prepare a polyimide precursor sample.

Preparation of 100% Imidized Reference Sample (iv) Using the same method as in (i) described above, a polyimide precursor composition as a measurement target is applied to a silicon wafer to prepare a coated film sample.

(v) The coated film sample is heated at 380° C. for 60 minutes to perform an imidization reaction. As a result, a 100% imidized reference sample is prepared.

Measurement and Analysis (vi) Using a Fourier transform infrared spectrometer (FT-730, manufactured by Horiba Ltd.), infrared absorption spectra of the 100% imidized reference sample and the polyimide precursor sample are measured. In the 100% imidized reference sample, a ratio I'(100) of an imide bond-derived absorption peak (Ab'(1780 cm$^{-1}$)) present near 1780 cm$^{-1}$ to an aromatic ring-derived absorption peak (Ab'(1,500 cm$^{-1}$)) present near 1,500 cm$^{-1}$ is obtained.

(vii) By performing the same measurement on the polyimide precursor sample, a ratio I(x) of an imide bond-derived absorption peak (Ab(1780 cm$^{-1}$)) present near 1780 cm$^{-1}$ to an aromatic ring-derived absorption peak (Ab(1,500 cm$^{-1}$)) present near 1,500 cm$^{-1}$ is obtained.

Using the respective measured absorption peaks I'(100) and I(x), the imidization ratio of the polyimide precursor is calculated based on the following expressions.

Imidization Ratio of Polyimide Precursor=$I(x)/I'(100)$ $I'(100)=(Ab'(1780\ cm^{-1}))/(Ab'(1,500\ cm^{-1}))$ $I(x)=(Ab(1,780\ cm^{-1}))/(Ab(1,500\ cm^{-1}))$ This measurement of the imidization ratio of the polyimide precursor may be adopted for the measurement of the imidization ratio of an aromatic polyimide precursor. In a case where the imidization ratio of an aromatic polyimide precursor is measured, a peak derived from a structure having no change before and after the imidization reaction is used as an internal standard peak instead of the aromatic ring-derived absorption peak.

Application of Polyimide Laminated Film

Examples of the application to which the polyimide laminated film according to the exemplary embodiment is applied include a gas separation film; a low dielectric constant material; and a heat insulating material.

EXAMPLES

Hereinafter, the invention will be described in more detail using examples but is not limited to these examples. In the following description, unless specified otherwise, "part(s)" and "%" represent "part(s) by weight" and "% by weight".

Preparation of Resin Particle Dispersion (1)

770 parts by weight of styrene, 230 parts by weight of butyl methacrylate, 25.0 parts by weight of a surfactant DOWFAX2A1 (47% solution, manufactured by The Dow Chemical Company), and 576 parts by weight of ion exchange water are mixed with each other, and the mixture is stirred and emulsified using a dissolver at 1,500 rpm for 30 minutes. As a result, a monomer emulsion is prepared. Next, 1.10 parts by weight of DOWFAX2A1 (47% solution, manufactured by The Dow Chemical Company) and 1,270 parts by weight of ion exchange water are put into a reaction container. After heated to 75° C. under nitrogen gas stream, 75 parts by weight of the monomer emulsion is added. Next, a polymerization initiator solution in which 15 parts by weight of ammonium persulfate is dissolved in 98 parts by weight of ion exchange water is added dropwise to the monomer emulsion for 10 minutes. After causing the reaction to occur for 50 minutes after the dropwise addition, the residual monomer emulsion is further added dropwise for 220 minutes, and the reaction is further performed for 50 minutes. Next, a solution obtained by mixing 5.0 parts of maleic acid and 10 parts of ion exchange water is added dropwise for five minutes, and a reaction is performed for 150 minutes. After cooling, a styrene-acrylic resin particle dispersion (1) having a solid content concentration of 34.0% and including styrene-acrylic resin particles having an acidic group on the surface is obtained. The average particle diameter of the resin particles is 0.40 μm.

Preparation of Resin Particle Dispersion Polyimide Precursor Solution (PAA-1)

180 g of ion exchange water is added to 100 g (approximately 190 g of water is contained) of the resin particle dispersion (1) in terms of a solid content of the resin particles, and then the solid content concentration of the resin particles is adjusted to 21.3%. 9.59 g (88.7 mmol) of p-phenylenediamine (molecular weight: 108.14) and 25.58 g (86.9 mmol) of 3,3',4,4'-biphenyltetracarboxylic dianhydride (molecular weight: 294.22) are added and dispersed with stirring at 20° C. for 10 minutes. Then, a solution obtained by mixing 25.0 g (247.3 mmol) of N-methyl morpholine (an organic amine compound), 15 g of N-methyl pyrrolidone, and 30 g of water is slowly added, and dissolved by stirring for 24 hours while being kept at a reaction temperature of 60° C. so as to perform a reaction, thereby obtaining a resin particle dispersion polyimide precursor solution (PAA-1) (resin particles/polyimide precursor=100/35.2 (weight ratio), concentration in the solution of the polyimide precursor is approximately 6.6%). As a result of diluting the obtained PAA-1 with water and measuring the particle diameter distribution, the average particle diameter has a single peak at 0.40 μm, similarly to the resin particle dispersion (1), which indicates a good dispersion state.

Preparation of Resin Particle Dispersion (2)

770 parts by weight of styrene, 230 parts by weight of butyl acrylate, 35.0 parts by weight of a surfactant DOWFAX2A1 (47% solution, manufactured by The Dow Chemical Company), and 576 parts by weight of ion exchange water are mixed with each other, and the mixture is stirred and emulsified using a dissolver at 1,500 rpm for 30 minutes. As a result, a monomer emulsion is prepared. Next, 1.10 parts by weight of DOWFAX2A1 (47% solution, manufactured by The Dow Chemical Company) and 1270 parts by weight of ion exchange water are put into a reaction container. After heated to 75° C. under nitrogen gas stream, 75 parts by weight of the monomer emulsion is added. Next, a polymerization initiator solution in which 15 parts by weight of ammonium persulfate is dissolved in 98 parts by weight of ion exchange water is added dropwise to the monomer emulsion for 10 minutes. After performing the reaction for 50 minutes after the dropwise addition, the residual monomer emulsion is further added dropwise for 220 minutes, and the reaction is further performed for 50 minutes. Next, a solution obtained by mixing 5.0 parts of methacrylic acid and 10 parts of ion exchange water is added dropwise over 5 minutes, and the reaction is performed for 150 minutes. After cooling, a styrene-acrylic resin particle dispersion (2) having a solid content concentration of 34.0% and including the styrene-acrylic resin particles having an acidic group on the surface is obtained. The average particle diameter of the resin particles is 0.31 μm.

Preparation of Resin Particle Dispersion Polyimide Precursor Solution (PAA-2)

180 g of ion exchange water is added to 100 g of resin particle dispersion (2) in terms of a solid content of the resin particles (approximately 190 g of water is contained) such that the solid content concentration of the resin particles is adjusted to 21.3%. 9.59 g (88.7 mmol) of p-phenylenediamine (molecular weight: 108.14) and 25.58 g (86.9 mmol) of 3,3',4,4'-biphenyltetracarboxylic dianhydride (molecular weight: 294.22) are added and dispersed by stirring at 20° C. for 10 minutes. Then, a solution obtained by mixing 25.0 g (247.3 mmol) of N-methyl morpholine (an organic amine compound), 15 g of N-methyl pyrrolidone, and 30 g of water is slowly added, and dissolved by stirring for 24 hours while being kept at a reaction temperature of 60° C. so as to perform a reaction, thereby obtaining a resin particle dispersion polyimide precursor solution (PAA-2) (resin particles/polyimide precursor=100/35.2 (weight ratio), concentration of the polyimide precursor in the solution is approximately 6.6%). As a result of diluting the obtained PAA-2 with water and measuring the particle diameter distribution, the average particle diameter has a single peak at 0.31 μm, similarly to the resin particle dispersion (1), which indicates a good dispersion state.

Preparation of Polyimide Precursor Solution (PA-1)

300 g of ion exchange water, 9.59 g (88.7 mmol) of p-phenylenediamine (molecular weight: 108.14), and 25.58 g (86.9 mmol) of 3,3',4,4'-biphenyl tetracarboxylic dianhydride (molecular weight: 294.22) are dispersed by stirring at 20° C. for 10 minutes. Then, a solution obtained by mixing 25.0 g (247.3 mmol) of N-methyl morpholine (organic amine compound), 15 g of N-methyl pyrrolidone, and 30 g of water is slowly added, and dissolved by stirring for 24 hours while being kept at a reaction temperature of 60° C., thereby preparing a polyimide precursor solution (PA-1).

Preparation of Polyimide Precursor Solution (PA-2)

250 g of N-methyl pyrrolidone, 9.59 g (88.7 mmol) of p-phenylenediamine (molecular weight: 108.14), and 25.58 g (86.9 mmol) of 3,3',4,4'-biphenyl tetracarboxylic dianhydride (molecular weight: 294.22) are dispersed by stirring at 20° C. for 10 minutes. Then, the obtained solution is and dissolved by stirring for 24 hours while being kept at a reaction temperature of 60° C., thereby preparing a polyimide precursor solution (PA-2).

Preparation of Polyimide Precursor Solution (PA-3)

250 g of N-methyl pyrrolidone, 3.11 g (28.8 mmol) of p-phenylenediamine (molecular weight: 108.14), 5.77 g (28.8 mmol) of 4,4'-diaminodiphenyl ether (molecular weight: 200.24), and 25.58 g (57.6 mmol) of (5,5'-2,2,2-trifluoro-1-(trifluoromethyl) ethylidene-bis-1,3-isobenzofurandione (6FDA) (molecular weight: 444.24) are dispersed by stirring at 20° C. for 10 minutes. Then, the obtained solution is and dissolved by stirring for 24 hours while being kept at a reaction temperature of 60° C., thereby preparing a polyimide precursor solution (PA-3).

Example 1

A glass substrate is coated with the polyimide precursor solution (PA-2) (varnish) such that the thickness of the coated film after drying becomes 2 μm, is dried at 80° C. until the NMP in the coated film reaches 50% with respect to the varnish, so that the concentration of the solid contents (polyamic acid) of the varnish is 50%, and then is coated with the resin particle dispersion polyimide precursor solution (PAA-1) such that the dried film thickness becomes 30 μm. After drying at 80° C. for one hour, the temperature is raised up to 400° C. at a speed of 10° C./min, the dried film is kept at 400° C. for one hour and then is cooled at room temperature (20° C., (hereinafter, the same shall apply)), thereby obtaining a polyimide film (PIF-1) having a film thickness of 32 μm, which is formed by laminating a porous layer and a non-porous layer (the filling layer). In the porous layer, the pores having a spherical shape are formed. For the obtained laminated polyimide film (PIF-1), the flaking between laminated layers, the state of the interface between the laminated layers, the tensile strength, the relative permittivity, the film smoothness, the resin components other than contained polyimide, and the organic amine component are evaluated. The results are shown in Table 1 below.

Figure 2:
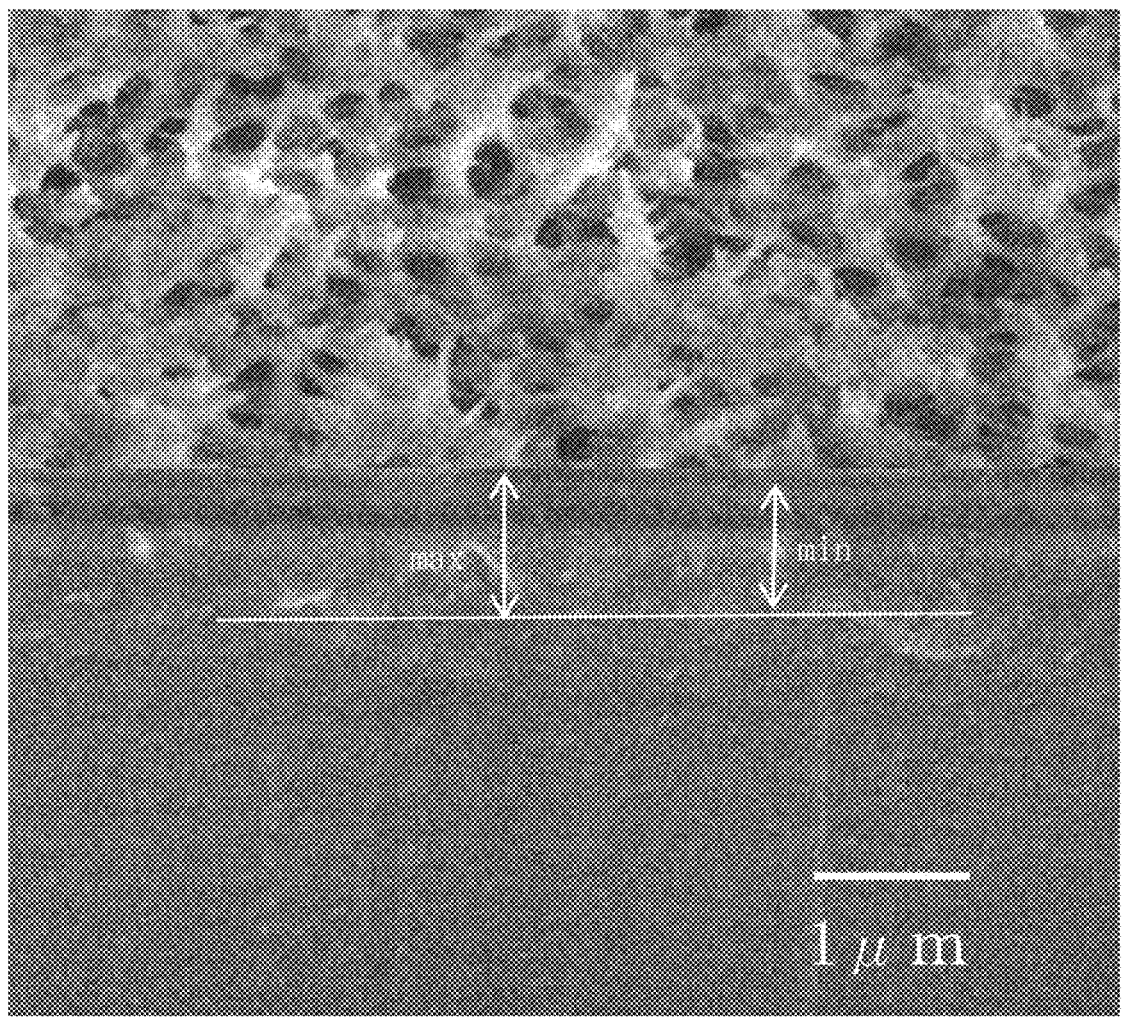
FIG. 2 is an image illustrating a state of the interface between the polyimide laminated films in Example 1.

In addition, the interfaces of the upper layer and the lower layer are observed by using VE SEM manufactured by KEYENCE. The results are shown in FIG. 2 below.

Evaluation of Separation Between Laminated Layers

A test for confirming the presence or absence of the separation between the laminated layers is performed by stretching a mending tape (manufactured by 3M Co., Ltd.) over each of the front and back surfaces of the prepared laminated polyimide film, and peeling the tapes in the direction in which the both sides of the film are peeled. Grading is performed as follows.
A: No separation between laminated layers
B: Separation occurs in some parts
C: Separation occurs on the entire surface Evaluation of State of Interface Between Laminated Layers: Variation in Interface Film Thickness of Non-Porous Polyimide Layer A cross-section of the prepared laminated polyimide film is cut off, and the interface of the laminated layers is observed by using VE SEM manufactured by KEYENCE. Note that, a cross-section image of the laminated polyimide film obtained in Example 1 is illustrated in FIG. 2. As an indicator of the disorder between the interface of the laminated layers, the maximum cross-section height Zt is obtained in such a manner that in the reference length (10 μm of width) of the interface with the porous polyimide layer of the non-porous polyimide layer, a reference line is drawn in a position of 1 μm from the average line of the interface to the non-porous polyimide layer side (if the film thickness is 1 μm or less, it is drawn outside the non-porous polyimide layer), the maximum value (max) and the minimum value (min) of the distance from the reference line are measured from the reference line, and from the difference, the maximum cross-section height Zt is obtained.

Evaluation of Tensile Strength of Laminated Polyimide Film

The prepared laminated polyimide film is cut off so as to obtain a sample having a size of 10 mm of width×200 mm of length. The tensile strength is calculated by performing the measurement in which a distance between marked lines is 100 mm and a tensile rate is 10 mm/min by a tensile tester (1605 N manufactured by Aikoh Engineering Co., Ltd.) based on JIS K 7127.

Measurement of Relative Permittivity

The complex permittivity at frequency 1 GHz is measured by a cavity resonator perturbation method, and real parts thereof are considered as relative permittivity. As a measuring instrument, a rectangular sample (sample size of 2 mm×70 mm in length) is used for the measurement with, a cylindrical cavity resonator ("Network Analyzer N5230C" manufactured by Agilent Technologies and "Cavity resonator at 1 GHz" manufactured by Kanto Electronic Application and Development Inc).

Evaluation of Smoothness of Laminated Polyimide Film

After peeling the prepared laminated polyimide film from the substrate, the laminated, polyimide film is placed on a glass plate, the smoothness of the laminated polyimide film is visually evaluated, and grading is performed as follows.
A: Entire surface is smooth
B: Warpage occurs in some parts
C: Strain occurs on entire surface Example 2

A glass substrate is coated with the polyimide precursor solution (PA-2) such that the thickness of the coated film after drying becomes 2 μm, is dried 130° C. until the NMP in the coated film reaches 5% with respect to the varnish, and then is coated with the resin particle dispersion polyimide precursor solution (PAA-1) such that the dried film thickness becomes 30 μm. After drying at 80° C. for one hour, the temperature is raised up to 400° C. at a speed of 10° C./min, the dried film is kept at 400° C. for one hour and then is cooled at room temperature, thereby obtaining a polyimide film (PIF-2) having a film thickness of 32 μm, which is formed by laminating a porous layer and a non-porous layer. In the porous layer, the pores having a spherical shape are formed. For the obtained laminated polyimide film (PIF-2), the separation between laminated layers, the state of the interface between the laminated layers, the tensile strength, the relative permittivity, the film smoothness, the resin, components other than contained polyimide, and the organic amine component are evaluated. The results are shown in Table 1.

Example 3

A glass substrate is coated with the polyimide precursor solution (PA-2) such that the thickness of the coated film after drying becomes 2 μm, is dried 130° C. for 30 minutes, then the temperature is raised up to 400° C. at a speed of 10° C./min, and the dried film is kept at 400° C. for one hour. After the temperature is lowered down to room temperature, the dried film is coated with a resin particle dispersion polyimide precursor solution (PAA-1) such that the thickness of the film thickness after drying becomes 30 μm. The obtained film is dried at 80° C. for one hour, the temperature is raised up to 400° C. at a speed of 10° C./min, the dried film is kept at 400° C. for one hour and is cooled at room temperature, thereby obtaining a polyimide film (PIF-3) having a film thickness of 32 μm, which is formed by laminating a porous layer and a non-porous layer. In the porous layer, the pores having a spherical shape are formed. For the obtained laminated polyimide film (PIF-3), the separation between laminated layers, the state of the interface between the laminated layers, the tensile strength, the relative permittivity, the film smoothness, the resin components other than contained polyimide, and the organic amine component are evaluated. The results are shown in Table 1.

Example 4

A glass substrate is coated with the polyimide precursor solution (PA-2) such that the thickness of the glass substrate after drying becomes 2 μm, is dried 130° C. until the NMP in the coated film reaches 55% with respect to the varnish so that the concentration of the solid contents of the varnish is 45%, and then is coated with the resin particle dispersion polyimide precursor solution (PAA-1) such that the dried film thickness becomes 30 μm. After drying at 80° C. for one hour, the temperature is raised up to 400° C. at a speed of 10° C./min, the dried film is kept at 400° C. for one hour and then is cooled at room temperature, and thereby a polyimide film (PIF-4) formed by laminating a porous layer and a non-porous layer which have the film thickness of 32 μm is obtained. In the porous layer, the pores having a spherical shape are formed. For the obtained laminated polyimide film (PIF-4), the separation between laminated layers, the state of the interface between the laminated layers, the tensile strength, the relative permittivity, the film smoothness, the resin components other than contained polyimide, and the organic amine component are evaluated. The results are shown in Table 1.

Example 5

A glass substrate is coated with the polyimide precursor solution (PA-1) such that the thickness of the coated film after drying becomes 2 μm, is dried at 80° C. until water in the coated film reaches 5% with respect to the varnish, and then is coated with the resin particle dispersion polyimide precursor solution (PAA-1) such that the dried film thickness becomes 30 μm. After drying at 80° C. for one hour, the temperature is raised up to 400° C. at a speed of 10° C./min, and the dried film is kept at 400° C. for one hour and then is cooled at room temperature, thereby obtaining a polyimide film (PIF-5) having a film thickness of 32 μm, which is formed by laminating a porous layer and a non-porous layer. In the porous layer, the pores having a spherical shape are formed. For the obtained laminated polyimide film (PIF-5), the separation between laminated layers, the state of the interface between the laminated layers, the tensile strength, the relative permittivity, the film smoothness, the resin components other than contained polyimide, and the organic amine component are evaluated. The results are shown in Table 1.

Examples 6 to 8

A laminated polyimide film is prepared in the same manner as in Example 1 except that the polyimide precursor solution, the resin particle dispersion polyimide precursor solution, and the film thickness are set as indicated in Table 1. In the porous layer, the pores having a spherical shape are formed. The evaluation results are shown in Table 1.

Example 9

A polyimide precursor solution (PA-3) is diluted temperature ten times with NMP, a glass substrate is coated with the polyimide precursor solution (PA-3) such that the thickness of the coated film after drying becomes 0.1 μm, is dried at 80° C. until the solvent in the coated film reaches 20% with respect to the varnish, and then is coated with the resin particle dispersion polyimide precursor solution (PAA-1) such that the dried film thickness becomes 30 μm. After drying at 80° C. for one hour, the temperature is raised up to 400° C. at a speed of 10° C./min, the dried film is kept at 400° C. for one hour and then is cooled at room temperature, thereby obtaining a polyimide film (PIF-9) having a film thickness of 30.1 μm, which is formed by laminating a porous layer and a non-porous layer. In the porous layer, the pores having a spherical shape are formed. For the obtained laminated polyimide film (PIF-9), the separation between laminated layers, the state of the interface between the laminated layers, the tensile strength, the relative permittivity, the film smoothness, the resin components other than contained polyimide, and the organic amine component are evaluated. The results are shown in Table 2.

Examples 10 to 13

A laminated polyimide film, is prepared in the same manner as in Example 9 except that the polyimide precursor solution, the resin particle dispersion polyimide precursor solution, and the film thickness are set as indicated in Table 2. In the porous layer, the pores having a spherical shape are formed. The evaluation results are shown in Table 2.

Comparative Example 1

A polyimide precursor solution (PA-3) is diluted temperature ten times with NMP, a glass substrate is coated with the polyimide precursor solution (PA-3) such that the thickness of the coated film after drying becomes 0.1 μm, and is dried 400° C. for one hour. In order to confirm the laminating properties, the obtained filmed is coated with the polyimide precursor solution (PA-2) such that the dried film, thickness becomes 30 μm. After drying at 80° C. for one hour, the temperature is raised up to 400° C. at a speed of 10° C./min, the dried film is kept at 400° C. for one hour and then is cooled at room temperature, thereby obtaining a polyimide film (RPIF-1) having a film thickness of 30 μm. Regarding the obtained laminated polyimide film (RPIF-1), the state of the interface between the laminated layers is tried to be confirmed, but is not able to be confirmed due to the polyimide layer which is dissolved by PA-3. For reference, the tensile strength, the relative permittivity, and the film smoothness are evaluated. The results are shown in Table 3.

Comparative Example 2

A single-layer of porous polyimide film (RPIF-2) is obtained by using the resin particle dispersion polyimide precursor solution (PAA-1) which is the same as that used in Example 1 except that a layer formed from, the polyimide precursor solution (PA-2) is not provided. Regarding the obtained polyimide film (RPIF-2), the tensile strength, the relative permittivity, and the film smoothness are evaluated. The results are shown in Table 3.

Comparative Example 3

A glass substrate is coated with the polyimide precursor solution (PA-3) such that the dried film thickness becomes 30 μm. After drying at 80° C. for one hour, the temperature is raised up to 400° C. at a speed of 10° C./min, the dried film is kept at 400° C. for one hour and then is cooled at room temperature, thereby obtaining a polyimide film (RPIF-3) having a film thickness of 30 μm. Regarding the obtained single-layer polyimide film (RPIF-3), the tensile strength, the relative permittivity, and the film smoothness are evaluated. The results are shown in Table 3.

Comparative Example 4

A glass substrate is coated with the resin particle dispersion polyimide precursor solution (PAA-1) such that the thickness of the coated film after drying becomes 2 μm, and is dried at 200° C. for 30 minutes so as to obtain a water-insoluble film. After that, the water-insoluble film is coated with the resin particle dispersion polyimide precursor solution (PAA-1) such that the coated film thickness after drying becomes 30 μm. After drying at 80° C. for one hour, the temperature is raised up to 400° C. at a speed of 10° C./min, the dried film is kept at 400° C. for one hour and then is cooled at room temperature (20° C.), thereby obtaining a polyimide film (RPIF-4) having a film thickness of 32 μm, which is formed by laminating porous layers. In the porous layer, the pores having a spherical shape are formed. For the obtained laminated polyimide film (RPIF-4), the separation between laminated layers, the state of the interface between the laminated layers, the tensile strength, the relative permittivity, the film smoothness, the resin components other than contained polyimide, and the organic amine component are evaluated. The results are shown in Table 3.

TABLE 1

| Example | | | Example 1 | Example 2 | Example 3 | Example 4 | Example 5 | Example 6 | Example 7 | Example 8 |
|---|---|---|---|---|---|---|---|---|---|---|
| Non-porous polyimide layer (filling layer) | Varnish | | PA-2 | PA-2 | PA-2 | PA-2 | PA-1 | PA-2 | PA-2 | PA-2 |
| | Average film thickness (μm) | | 2.0 | 2.0 | 2.0 | 2.0 | 2.0 | 20.0 | 90.0 | 20.0 |
| | Residual solvent amount before porous coating (% by weight) | | 50 | 5 | 0 | 55 | 5 | 50 | 50 | 50 |
| Porous layer | Fine particle dispersion varnish | | PAA-1 | PAA-1 | PAA-1 | PAA-1 | PAA-1 | PAA-2 | PAA-2 | PAA-1 |
| | Average film thickness (μm) | | 30.0 | 30.0 | 30.0 | 30.0 | 30.0 | 90.0 | 20.0 | 20.0 |
| | Content of resin other than polyimide resin (% by weight) | | 0.40 | 0.39 | 0.43 | 0.40 | 0.38 | 0.35 | 0.29 | 0.30 |
| | Content of organic amine (% by weight) | | 0.031 | 0.028 | 0.040 | 0.039 | 0.035 | 0.031 | 0.024 | 0.029 |
| | Porosity (%) | | 68% | 69% | 66% | 67% | 66% | 70% | 69% | 67% |
| | Laminated film | | PIF-1 | PIF-2 | PIF-3 | PIF-4 | PIF-5 | PIF-6 | PIF-7 | PIF-8 |
| | Separation between laminated films | | A | B | C | A | A | A | B | A |
| | State of interface of polyimide laminated films | | A | A | A | B | B | A | A | A |
| | Maximum cross-section height Zt (μm) | | 0.08 | 0.06 | 0.04 | 0.32 | 0.07 | 0.09 | 0.07 | 0.07 |
| | Tensile strength (MPa) | | 3.2 | 3.2 | 3.2 | 3.2 | 3.2 | 120 | 160 | 41 |
| | Relative permittivity | | 1.9 | 1.9 | 1.9 | 1.9 | 1.9 | 2.1 | 3.0 | 2.5 |
| | Film smoothness | | A | A | A | A | A | B | C | B |

TABLE 2

| Example | | Example 9 | Example 10 | Example 11 | Example 12 | Example 13 |
|---|---|---|---|---|---|---|
| Non-porous polyimide layer (filling layer) | Varnish | PA-3 | PA-3 | PA-3 | PA-3 | PA-3 |
| | Average film thickness (μm) | 0.1 | 0.1 | 0.1 | 0.1 | 0.3 |
| | Residual solvent amount before porous coating (% by weight) | 20 | 20 | 60 | 20 | 20 |
| Porous layer | Fine particle dispersion varnish | PAA-1 | PAA-2 | PAA-2 | PAA-2 | PAA-1 |
| | Average film thickness (μm) | 30.0 | 30.0 | 30.0 | 50.0 | 30.0 |
| | Content of resin other than polyimide resin (% by weight) | 0.41 | 0.39 | 0.38 | 0.45 | 0.33 |
| | Content of organic amine (% by weight) | 0.029 | 0.031 | 0.029 | 0.051 | 0.035 |
| | Porosity (%) | 67% | 69% | 68% | 65% | 68% |
| | Laminated film | PIF-9 | PIF-9 | PIF-9 | PIF-9 | PIF-9 |
| | Separation between laminated films | A | A | A | A | A |
| | State of interface of polyimide laminated films | A | A | C | A | A |
| | Maximum cross-section height Zt (μm) | 0.04 | 0.03 | 0.06 | 0.04 | 0.04 |
| | Tensile strength (MPa) | 0.2 | 0.2 | 0.1 | 0.3 | 0.2 |
| | Relative permittivity | 1.7 | 1.7 | 1.7 | 1.6 | 1.7 |
| | Film smoothness | A | A | A | A | A |

TABLE 3

|  |  | Comparative Example 1 | Comparative Example 2 | Comparative Example 3 | Comparative Example 4 |
|---|---|---|---|---|---|
| Non-porous polyimide layer (filling layer) | Varnish | PA-3 | — | — | PAA-1 |
|  | Average film thickness (μm) | 0.1 | — | — | 2.0 |
| Residual solvent amount before porous coating (% by weight) |  | 0 | — | — | 0 |
| Porous layer | (Fine particle dispersion) varnish | PA-2 | PAA-1 | PA-3 | PAA-1 |
|  | Average film thickness (μm) | 30.0 | 30.0 | 30.0 | 30.0 |
|  | Content of resin other than polyimide resin (% by weight) | — | — | — | 0.40 |
|  | Content of organic amine (% by weight) | — | — | — | 0.031 |
|  | Porosity (%) | — | — | — | 68% |
|  | Laminated film | RPIF-1 | RPIF-2 | RPIF-3 | RPIF-4 |
| Separation between laminated films |  | — | — | — | B |
| State of interface of polyimide laminated films |  | No interface | — | — | — |
|  | Maximum cross-section height Zt (μm) | — | — | — | — |
|  | Tensile strength (MPa) | 70 | 0.05 | 55 | 0.05 |
|  | Relative permittivity | 3.4 | 1.6 | 3.2 | 1.6 |
|  | Film smoothness | A | A | A | A |

From the above results, it is found that the mechanical strength is improved in Examples as compared with Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polyimide laminated film comprising:
   a porous polyimide layer that has a porosity of from 30% to 90% and pores having a spherical shape, the porous polyimide layer comprising an organic compound and a resin other than a polyimide resin; and
   a non-porous polyimide layer that has a porosity of 5% or less,
   wherein a content of the resin other than the polyimide resin is from 0.29% by weight to 0.45% by weight with respect to the porous polyimide layer, and
   wherein the organic compound is at least one selected from the group consisting of 2-dimethyl aminoethanol, 2-diethyl aminoethanol, 2-dimethyl aminopropanol, N-methyl morpholine, N-ethyl morpholine, 1,2-dimethyl imidazole, N-methyl piperidine, and N-ethyl piperidine.

2. The polyimide laminated film according to claim 1, wherein the polyimide laminated film satisfies the following Expressions (1) and (2):

$$Tp > Tn \tag{1}$$

$$10\,\mu m \leq Tp + Tn \leq 100\,\mu m \tag{2}$$

wherein Tp represents an average film thickness of the porous polyimide layer (in a case of including a plurality of the porous polyimide layers, a sum of respective average film thicknesses of the porous polyimide layers), and Tn represents an average film thickness of the non-porous polyimide layer (in a case of including a plurality of the non-porous polyimide layers, a sum of respective average film thicknesses of the non-porous polyimide layers).

3. The polyimide laminated film according to claim 1, wherein the porous polyimide layer contacts the non-porous polyimide layer.

4. The polyimide laminated film according to claim 3, wherein in a cross-section in a direction orthogonal to an interface between the non-porous polyimide layer and the porous polyimide layer, a maximum cross-section height Zt obtained from a sum of a maximum value of a mountain height Zp of a contour curve of the interface and a maximum value of a valley depth Zv is 0.5 μm or less.

5. The polyimide laminated film according to claim 1, wherein the porosity of the porous polyimide layer is 50% to 90%.

6. The polyimide laminated film according to claim 1, wherein Tp is from 5 μm to 100 μm.

7. The polyimide laminated film according to claim 1, wherein Tp is from 5 μm to 70 μm.

8. The polyimide laminated film according to claim 1, wherein Tn is from 1 μm to 100 μm.

9. The polyimide laminated film according to claim 1, wherein Tn is from 1 μm to 50 μm.

10. The polyimide laminated film according to claim 1, wherein a ratio of Tp to Tn (Tp/Tn) is more than 1/1 and is 100/1 or less.

11. A method of preparing the polyimide laminated film according to claim 1, the method comprising:
   preparing a first polyimide precursor solution containing a solvent and a first polyimide precursor, and not containing first resin particles which are not dissolved in the first polyimide precursor solution or containing the first resin particles such that a volume ratio of the first resin particles is 5% or less after film formation;
   preparing a second polyimide precursor solution containing an aqueous solvent, a second polyimide precursor, and an organic amine compound, and further containing second resin particles which are not dissolved in the second polyimide precursor solution such that a volume ratio of the second resin particles is 30% or more after film formation;

forming a first film on a substrate with the first polyimide precursor solution;

forming a second film on the first film with the second polyimide precursor solution;

heating the first film and the second film concurrently or separately to imidize the first film and the second film; and removing first and second resin particles from the first and second films.

12. The method of preparing a polyimide laminated film according to claim 11, wherein the forming of the first film includes drying the first film such that a content of a solvent remaining in the first film is from 5% by weight to 100% by weight with respect to a weight of the first polyimide precursor.

13. The method of preparing a polyimide laminated film according to claim 11, wherein the second resin particles have an acidic group on a surface thereof.

14. The method of preparing a polyimide laminated film according to claim 13, wherein the acidic group is at least one selected from the group consisting of a carboxy group, a sulfonyl group, and a phenolic hydroxyl group.

15. The method of preparing a polyimide laminated film according to claim 11, wherein the removing of the first and second resin particles is performed using an organic solvent that dissolves the first resin particles and the second resin particles.

16. The method of preparing a polyimide laminated film according to claim 11, wherein the removing of the first and second resin particles is performed by heating the first resin particles and the second resin particles.

* * * * *